US012220707B2

(12) United States Patent
Hamilton et al.

(10) Patent No.: US 12,220,707 B2
(45) Date of Patent: Feb. 11, 2025

(54) METHOD AND APPARATUS FOR PROCESSING MAGNETITE

(71) Applicant: IB OPERATIONS PTY LTD, East Perth (AU)

(72) Inventors: Andrew Graham Hamilton, East Perth (AU); Gerald Michael Larosa, East Perth (AU)

(73) Assignee: IB OPERATIONS PTY LTD, East Perth (AU)

( * ) Notice: Subject to any disclaimer, the term of this patent is extended or adjusted under 35 U.S.C. 154(b) by 672 days.

(21) Appl. No.: 17/294,122

(22) PCT Filed: Aug. 16, 2019

(86) PCT No.: PCT/AU2019/050865
§ 371 (c)(1),
(2) Date: May 14, 2021

(87) PCT Pub. No.: WO2020/097666
PCT Pub. Date: May 22, 2020

(65) Prior Publication Data

US 2022/0008932 A1 Jan. 13, 2022

(30) Foreign Application Priority Data

Nov. 14, 2018 (AU) ................................ 2018904331
Jul. 5, 2019 (AU) ................................ 2019902398

(51) Int. Cl.
*B02C 4/02* (2006.01)
*B02C 4/30* (2006.01)
(Continued)

(52) U.S. Cl.
CPC ................ *B02C 23/12* (2013.01); *B02C 4/02* (2013.01); *B02C 4/30* (2013.01); *B02C 4/42* (2013.01);
(Continued)

(58) Field of Classification Search
CPC .... B02C 4/02; B02C 4/30; B02C 4/42; B02C 23/12
See application file for complete search history.

(56) References Cited

U.S. PATENT DOCUMENTS 3,905,556 A * 9/1975 Drage ..................... B02C 23/14 241/DIG. 38
5,992,774 A * 11/1999 Oh .......................... B03B 9/065 241/20
(Continued)

FOREIGN PATENT DOCUMENTS

CN 101579654 A 11/2009
CN 103736663 A * 4/2014 ............ B02C 21/00
(Continued)

OTHER PUBLICATIONS

S.F. Shinkorenko, "Handbook on the enrichment of ferrous ores" Moscow, "Nedra" publishing house, 1980, 2nd edition.
(Continued)

*Primary Examiner* — Faye Francis
(74) *Attorney, Agent, or Firm* — Quarles & Brady LLP

(57) ABSTRACT

A method of processing magnetite iron ore, including the step of using a high pressure grinding roller (HPGR) to crush the magnetite. An apparatus for processing magnetite iron ore, including a first high pressure grinding roller for crushing the magnetite, a dry screen for selectively feeding back material to the first high pressure grinding roller, an air classifier for selectively feeding back material to the second high pressure grinding roller, a second high pressure grinding roller for grinding the magnetite, and a dry magnetic separation (DMS) unit for discarding non-magnetic materials, wherein the dry magnetic separation unit is outside the two feedback loops associated with the first and second high pressure grinding rollers.

16 Claims, 17 Drawing Sheets

(51) Int. Cl.

| | |
|---|---|
| ***B02C 4/42*** | (2006.01) |
| ***B02C 23/12*** | (2006.01) |
| ***B02C 23/14*** | (2006.01) |
| ***B03C 1/14*** | (2006.01) |
| ***B03C 1/30*** | (2006.01) |
| ***B07B 9/00*** | (2006.01) |

(52) U.S. Cl.
CPC ................ *B02C 23/14* (2013.01); *B03C 1/14* (2013.01); *B03C 1/30* (2013.01); *B07B 9/00* (2013.01); *B03C 2201/18* (2013.01)

(56) References Cited

U.S. PATENT DOCUMENTS

2014/0014748 A1* 1/2014 Zeeck ..................... B02C 23/02
241/43
2018/0036803 A1* 2/2018 Yamamoto ................ B03C 1/30

FOREIGN PATENT DOCUMENTS

CN 104815739 A 8/2015
CN 105413842 B * 11/2016 ............. B02C 21/00
CN 108787159 A 11/2018
CN 218742467 U * 3/2023 ............. B02C 21/00
WO WO-2016127235 A1 * 8/2016 ............. B02C 23/14
WO WO-2017045041 A1 * 3/2017 ............. B02C 21/00
WO 2020097666 A1 5/2020

OTHER PUBLICATIONS

Official Action of Eurasian Patent Application No. 202191361 dated May 4, 2022, with English translation, 5 pages.
Van der Meer, F.P. and Maphosa, W., 'High Pressure Grinding Moving Ahead in Copper, Iron, And Gold Processing', The Journal of The Southern African Institute of Mining and Metallurgy Jul. 2012, vol. 112, pp. 637-647.
International Search Report corresponding to Internatonal Patent Application No. PCT/AU2019/050865, dated Oct. 30, 2019, 5 pages.

* cited by examiner

METHOD AND APPARATUS FOR PROCESSING MAGNETITE

CROSS-REFERENCE TO RELATED APPLICATIONS

This application is a national stage application filed under 35 U.S.C. § 371, of International Patent Application No. PCT/AU2019/050865, filed on Aug. 16, 2019, which claims the benefit and priority to Australian Application No. 2019902398 filed on Jul. 5, 2019 and Australian Application No. 2018904331 filed on Nov. 14, 2018, the entire contents of which are hereby incorporated herein by reference in their entireties.

FIELD OF THE INVENTION

The present invention relates to a method and apparatus for processing magnetite and more specifically, but not exclusively, to a method and apparatus for processing magnetite with improved cost effectiveness through the reduction in energy consumption in processing the magnetite into a form suitable for international shipping.

BACKGROUND TO THE INVENTION

It is known to mine iron ore for the production of steel and the like. Iron ore is one of Australia's most significant exports, however the applicant has identified a problem in that some hematite iron ore can be subject to lower desirability and pricing on the international market owing to the quality of the iron ore product and, in particular, the purity of the product by weight (that is, the percentage of the product by weight which is actually iron).

Iron ores are rocks and minerals from which metallic iron can be economically extracted. The iron itself is usually found in the form of magnetite ($Fe_3O_4$, 72.4% Fe), hematite ($Fe_2O_3$, 69.9% Fe), goethite (FeO(OH), 62.9% Fe), limonite ($FeO(OH)\cdot n(H_2O)$, 55% Fe) or siderite ($FeCO_3$, 48.2% Fe). Although iron is the fourth most abundant element in the Earth's crust, comprising about 5%, the vast majority is bound in silicate or more rarely carbonate minerals. The thermodynamic barriers to separating pure iron from these minerals are formidable and energy intensive, therefore all sources of iron used by human industry exploit comparatively rarer iron oxide minerals, primarily hematite.

The applicant has identified that the grade of Direct-Shipping iron-Ore (DSO) deposits (typically composed of hematite) is getting worse as resources are progressively being used, this lower grade being a strong contributor to the decline in desirability and pricing. In contrast, the applicant has identified that magnetite concentrate grades are generally in excess of 66% iron by weight and usually are low phosphorus, low aluminium, low titanium and low silica and demand a premium price. However, there exists a problem in that processing magnetite is typically not cost-effective as it requires a lot of energy and water. Examples of the present invention seek to provide a method of processing magnetite iron ore which has improved cost-effectiveness through using less energy and/or water.

SUMMARY OF THE INVENTION

In accordance with one aspect of the present invention, there is provided a method of processing magnetite iron ore, including the step of using a high pressure grinding roller (HPGR) to crush the magnetite.

Preferably, the step of using a high pressure grinding roller crushes the magnetite from a feed particle size distribution of at least 80 mm to a feed particle size distribution of 8 mm. More preferably, the step of using a high pressure grinding roller crushes the magnetite from a feed particle size distribution of at least 80 mm, 100% passing ($F_{100}$80 mm), to a feed particle size distribution of 8 mm, 100% passing ($F_{100}$8 mm).

In the case of at least one particular make/model of machine, the step of using a high pressure grinding roller includes using the high pressure grinding roller with 2.4 m diameter×2.2 m wide roll operating at 4 N/mm$^2$ pressure and 2.7 m/s roll speed.

Preferably, further including the step of using a screen to generate a consistent product, and the step of using a dry magnetic separation unit (DMS) unit to discard non-magnetic materials. More preferably, the dry magnetic separation unit has a composite material construction drum. Alternatively, the drum may be formed from other materials such as carbon fibre or kevlar.

It is preferred that the method further includes the step of passing the particles through an air classifier which separates fines which are fed to a bag house from coarse particles which are fed back to a further high pressure grinding roller for grinding the particles from $F_{100}$6-8 mm to $P_{80}$60-100 μm.

In accordance with another aspect of the present invention, there is provided an apparatus for processing magnetite iron ore, including a dry magnetic separation (DMS) unit having a composite fabrication drum, the dry magnetic separation unit being for discarding non-magnetic materials.

Preferably, the apparatus for processing magnetite iron ore includes a high pressure grinding roller (HPGR) to crush the magnetite. More preferably, the apparatus for processing magnetite iron ore includes a dry screen for separating undersize particles from oversize particles which are recycled back through the high pressure grinding roller.

Even more preferably, the apparatus for processing magnetite iron ore includes a further high pressure grinding roller (HPGR) for grinding the particles from $F_{100}$6-8 mm to $P_{80}$60-100 μm and an air classifier for separating material which is to be extracted from material which is to be fed back to the further high pressure grinding roller for additional grinding.

In accordance with another aspect of the present invention, there is provided an apparatus for processing magnetite iron ore, including a first high pressure grinding roller for crushing the magnetite, a dry screen for selectively feeding back, material to the first high pressure grinding roller, an air classifier for selectively feeding coarse material to the second high pressure grinding roller, a second high pressure grinding roller for further grinding of the magnetite, returning material to the air classifier and a dry magnetic separation (DMS) unit for discarding non-magnetic materials, wherein the dry magnetic separation unit is outside the two feedback loops associated with the first and second high pressure grinding rollers.

There is also disclosed an apparatus for processing magnetite iron ore, including an upstream cyclone and a mill for grinding particles, wherein the upstream cyclone is arranged to operate as a splitter by diverting the overflow material of the upstream cyclone to bypass the mill and by feeding the underflow material of the upstream cyclone to the mill.

Preferably, the mill is in the form of a High Intensity Grinding mill (HIGmill).

It is preferred that the mill is arranged in the apparatus without any feedback path to the mill.

In one form, the cyclone is arranged to divert approximately 25% of material to bypass the mill.

Preferably, the cyclone is arranged to divert finely ground material around the mill to prevent overgrinding feed material, and thus reducing the overall mill power consumption.

In a preferred form, the mill is configured to operate in a comparable low energy grind mode, where difficult particles are allowed to pass through the open circuit configuration at above the target grind size to be processed and/or discarded through later processing steps.

Preferably, the apparatus includes a downstream deslime thickener, wherein the downstream deslime thickener is fed material from the mill and from the upstream cyclone overflow. More preferably, the downstream deslime thickener is arranged to deslime material from the mill and from the upstream cyclone overflow at a rise rate to discard silica and non-magnetic materials.

Preferably, the downstream deslime thickener is arranged to deslime material from the mill and from the upstream cyclone overflow at a rise rate to discard silica and non-magnetic materials at relatively low magnetic material losses compared to mass loss. More preferably, the downstream deslime thickener is arranged to deslime material from the mill and from the upstream cyclone overflow at a high rise rate of 8-10 m/h to discard silica and non-magnetic materials at relatively low magnetic material losses compared to mass loss.

It is preferred that the downstream deslime thickener is arranged such that an overflow from the downstream deslime thickener is diverted to a tailings storage facility whereas an underflow from the downstream deslime thickener is fed onward for further processing.

Preferably, the apparatus includes a magnetic separator arranged to send magnetic material to said cons cyclone and to divert non-magnetic material to the tailings storage facility. More preferably, said magnetic separator provides wet magnetic separation.

There is also disclosed an apparatus for processing magnetite iron ore, including a mill for grinding ore particles, wherein the mill is in the form of a Vertical Stirred Mill (VSM).

In a preferred form, the second circuit grinds the more difficult material that has passed through the first mill circuit; the mill product from the first mill circuit is further processed to remove non-magnetic materials (via the deslime thickeners and cleaner magnetic separators) where the magnetic concentrate stream is further sized via cyclones (to remove fines) and high frequency low amplitude vibrating screens where the high frequency low amplitude vibrating screen oversize stream serves as feed to the second stage open circuit mill system.

More preferably, although the second stage open circuit mill system is operated at a higher energy grind mode than the first stage circuit, the feed to the second stage circuit is only 12-18% of the feed stream to the first stage mill circuit, thus minimising overall mill power consumption by only grinding the larger, lower flower rate, more difficult material.

There is also disclosed an apparatus for processing magnetite iron ore, including a cons cyclone arranged to send underflow material to the high frequency vibrating screen and overflow material to downstream CCD deslime thickener.

There is also disclosed an apparatus for processing magnetite iron ore, including a screen arranged to send oversize material to a regrind mill and undersize material to a high grade concentrate thickener.

Preferably, the high grade concentrate thickener is arranged to divert overflow to a tailings storage facility and to feed underflow to a filter feed tank. More preferably, all material from the regrind mill is fed to a magnetic separator which diverts non-magnetic material to the tailings storage facility and feeds magnetic material to one or more deslime CCD thickeners.

In a preferred form, the one or more deslime thickeners are arranged to divert overflow to the tailings storage facility and to feed underflow to the filter feed tank. More preferably, the apparatus includes a cyclone separator arranged to feed overflow to said one or more deslime thickeners, and to feed underflow to said screen for screening. Even more preferably, the apparatus provides a product upgrade circuit whereby percentage by mass content of iron is able to be increased to guarantee a specific grade.

Preferably, the apparatus provides a product upgrade circuit whereby percentage by mass content of iron is able to be increased to guarantee a grade of at least 67% by weight content of iron (Fe).

In one form, the high grade concentrate thickener is able to provide a high grade magnetite product, for example 25% of total product at a Fe grade of at least 68%.

Preferably, the product upgrade circuit minimises additional grinding by processing only 15-20% of material fed to the cons cyclone separator and ensures a final concentrate product is at $P_{98}$ of 45 μm (screen) to achieve target grade of at least 67% Fe and less than 6% $SiO_2$.

There is also disclosed a method of dewatering magnetite, including the step of extracting water from the magnetite by virtue of the magnetism of the magnetite, whereby the magnetite pulls together under magnetic attraction thereby squeezing water outwardly and away from the magnetite.

Preferably, the method includes the step of using a magnetic drum to cause the magnetite to compress itself toward the drum, thereby expelling water from the magnetite. More preferably, the drum is arranged such that the magnetite material peels away from the magnetic drum under gravitational force after expelling water. Even more preferably, the magnetite is fed along a belt filter which allows water to drop downwardly from the magnetite and through the belt filter.

There is also disclosed an apparatus for dewatering magnetite, including a magnetic drum arranged to cause the magnetite to compress itself toward the drum, thereby expelling water from the magnetite.

Preferably, the apparatus includes a conveyor belt filter arranged such that magnetite conveyed along an upper surface of the belt filter will compress itself downwardly under magnetic attraction within the magnetite such that water is expelled from the magnetite and drains through the conveyor belt filter.

More preferably, the apparatus is configured to achieve a target moisture content of less than or equal to 10% w/w.

In accordance with another aspect of the present invention, there is provided an apparatus for processing magnetite iron ore, including a first high pressure grinding roller (HPGR) for crushing the magnetite iron ore into particles, and a second high pressure grinding roller (HPGR) for grinding the particles.

Preferably, the first high pressure grinding roller crushes the magnetite iron ore from a feed particle size distribution of at least 80 mm, 100% passing ($F_{100}$80 mm), to a feed particle size distribution of 8 mm, 100% passing ($F_{100}$8 mm).

In a preferred form, the second high pressure grinding roller crushes the particles from a feed particle size distribution of 6-8 mm, 100% passing, to a feed particle size distribution of 60-100 μm, 80% passing.

In accordance with another aspect of the present invention, there is provided a method of processing a low moisture magnetite ore body via a two-stage HPGR circuit which allows for the optimisation of the HPGR to work from top size of 80 mm to produce a product $P_{80}$ of 80 μm to reduce power consumption.

Preferably, a first HPGR circuit is in closed circuit with a screen, and a second HPGR circuit is closed with an Air Classifier/Baghouse system.

More preferably, the two circuits are separated by Dry Magnetic Separation, to remove non-magnetic waste material prior to the second circuit, thus reducing the throughput and additional grinding to the second HPGR circuit.

In accordance with another aspect of the present invention, there is provided an apparatus for processing magnetite iron ore, including an upstream cyclone and a mill for grinding particles, wherein the upstream cyclone is arranged to operate as a splitter by diverting material in an overflow of the upstream cyclone to bypass the mill and by feeding material in an underflow of the upstream cyclone to the mill, and wherein the apparatus includes a magnetic separator arranged to send magnetic material to said upstream cyclone and to divert non-magnetic material.

Preferably, the magnetic separator is arranged to divert non-magnetic material to a tailings storage facility.

In accordance with another aspect of the present invention, there is provided an apparatus when used for processing magnetite iron ore, the apparatus including a screen arranged to send oversize material to a regrind mill and undersize material to a high grade concentrate thickener and includes a Counter Current Decantation (CCD) thickener type system for product grade improvements.

Preferably, the apparatus provides a product upgrade circuit whereby the mass content of iron is able to be increased to guarantee a grade of at least 67% by weight content of iron (Fe) from 64 to 65 wt % total Fe magnetite feed streams with minimal loss by removing slimes (cons cyclone) prior to further hydro-separation processing, and by limiting +45 micron material to <2 wt % in the final product stream via derrick screens followed by regrind mills and magnetic separators to limit oversize mass loss.

In accordance with another aspect of the present invention, there is provided a magnetite iron ore processing apparatus, the apparatus including a screen arranged to send oversize material to a regrind mill and undersize material to a high grade concentrate thickener, the apparatus including a Counter Current Decantation (CCD) thickener type system for product grade improvements.

Preferably, the apparatus includes a cyclone separator arranged to feed overflow to one or more CCD deslime thickeners and to feed underflow to said screen for screening, the apparatus also including a product upgrade circuit minimising additional grinding by processing only 15-20% of material fed to the cyclone separator and ensuring a final concentrate product is at $P_{98}$ of 45 μm (screen) to achieve target grade of at least 67% Fe and less than 6% $SiO_2$.

In accordance with another aspect of the present invention, there is provided a method of dewatering fine magnetite concentrate (P80L≤45 μm or more specifically P80L of 25 μm-35 μm) to ≤10% w/w moisture content, with an apparatus for dewatering magnetite as described above, where the dewatered magnetite is discharged from the drum and further dewatered using a conveyor belt filter arranged such that the magnetite conveyed along the upper surface of the belt filter will compress itself downwardly under magnetic attraction within the magnetite such that water is further expelled from the magnetite and drains through the conveyor belt filter.

BRIEF DESCRIPTION OF THE DRAWINGS

A preferred embodiment of the invention will be described, by way of non-limiting example only, with reference to the accompanying drawings in which.

Figure 9:
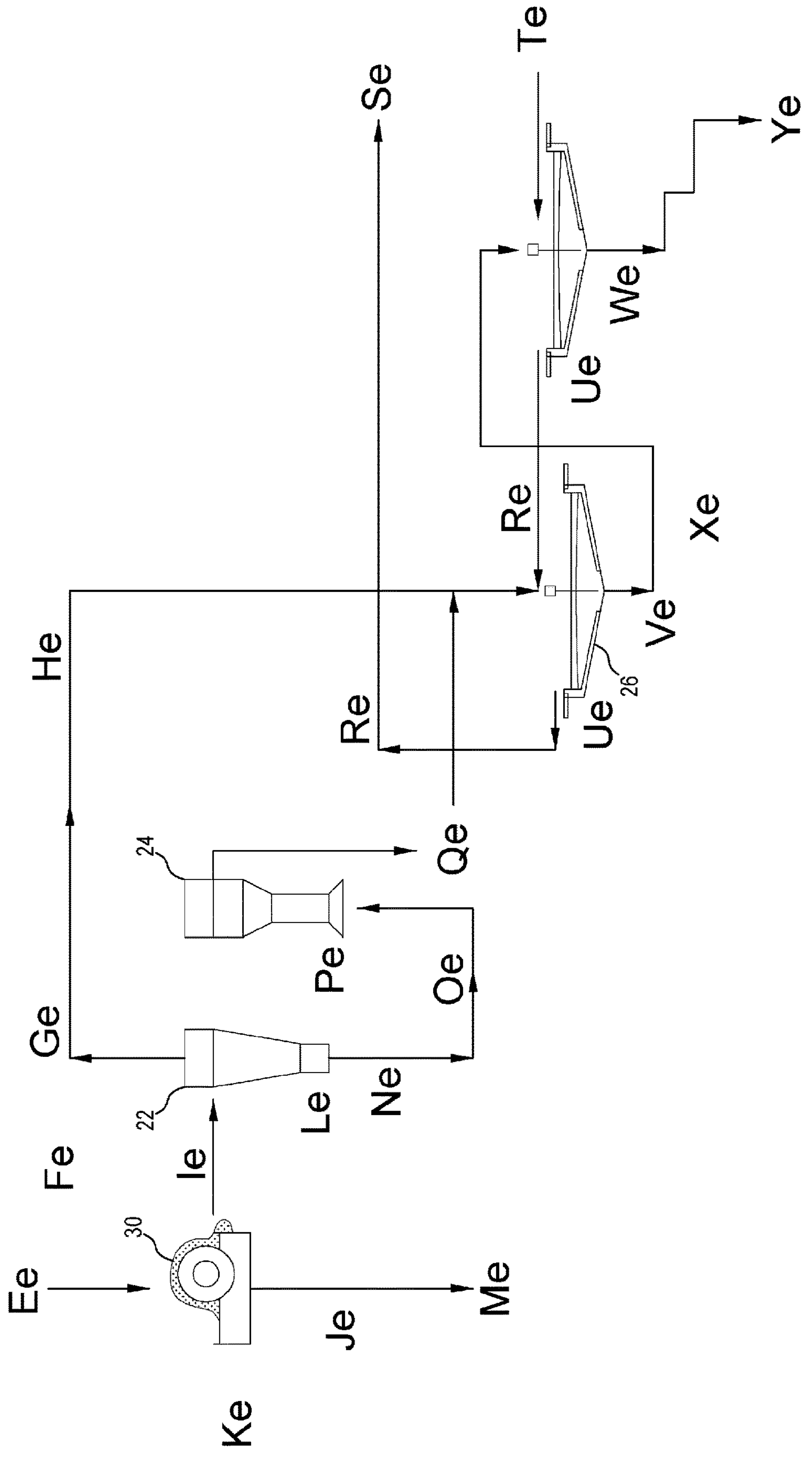
FIG. 9 shows Modules 5A and 5B combined.
Figure 10:
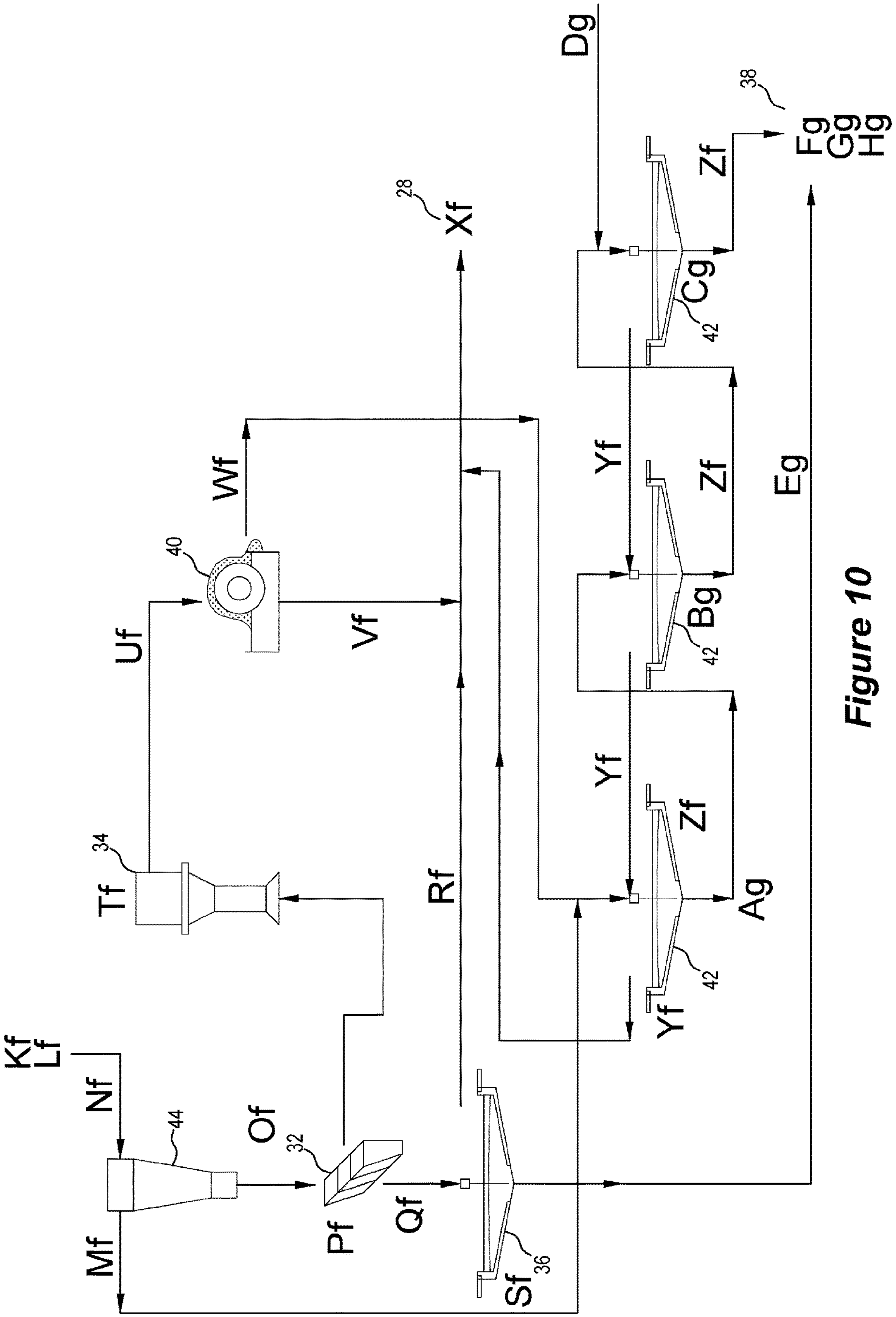

FIG. **9*a* shows an alternate flowsheet which further expands on FIG. 9** to demonstrate the second circuit to grind the more difficult material that has passed through the first mill circuit;

FIG. 10 shows Module 5C; and

FIGS. 11 to 18 show an alternative to hyperbaric filtration, being dewatering magnetic drums followed by belt filters.

DETAILED DESCRIPTION

With reference to FIGS. 1 to 18, there is shown a method and apparatus for processing magnetite according to a preferred embodiment of the present invention.

Figure 1:
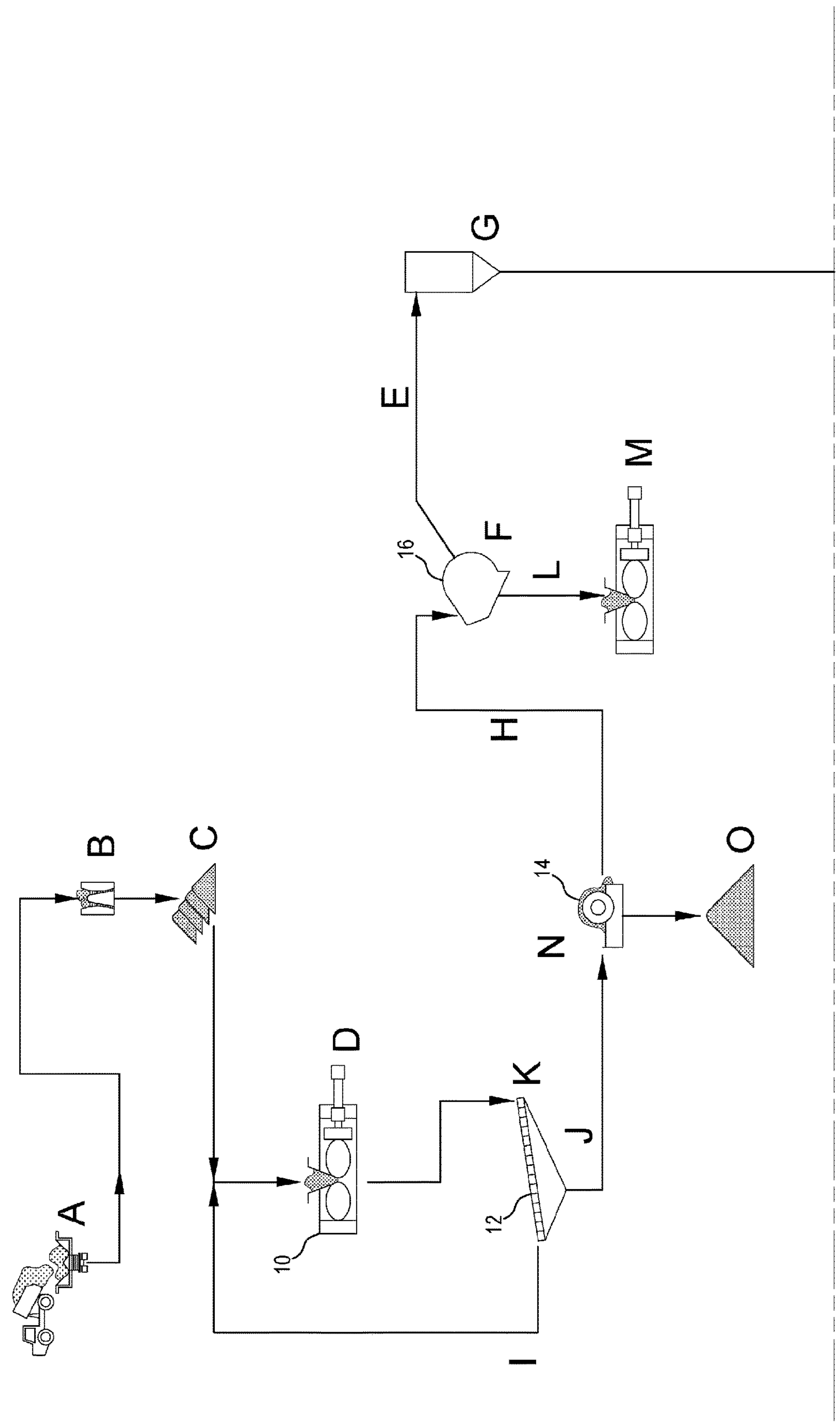
FIG. 1 is an overall "Stage 2" processing flowsheet, including Modules 1 to 7.
Figure 1:
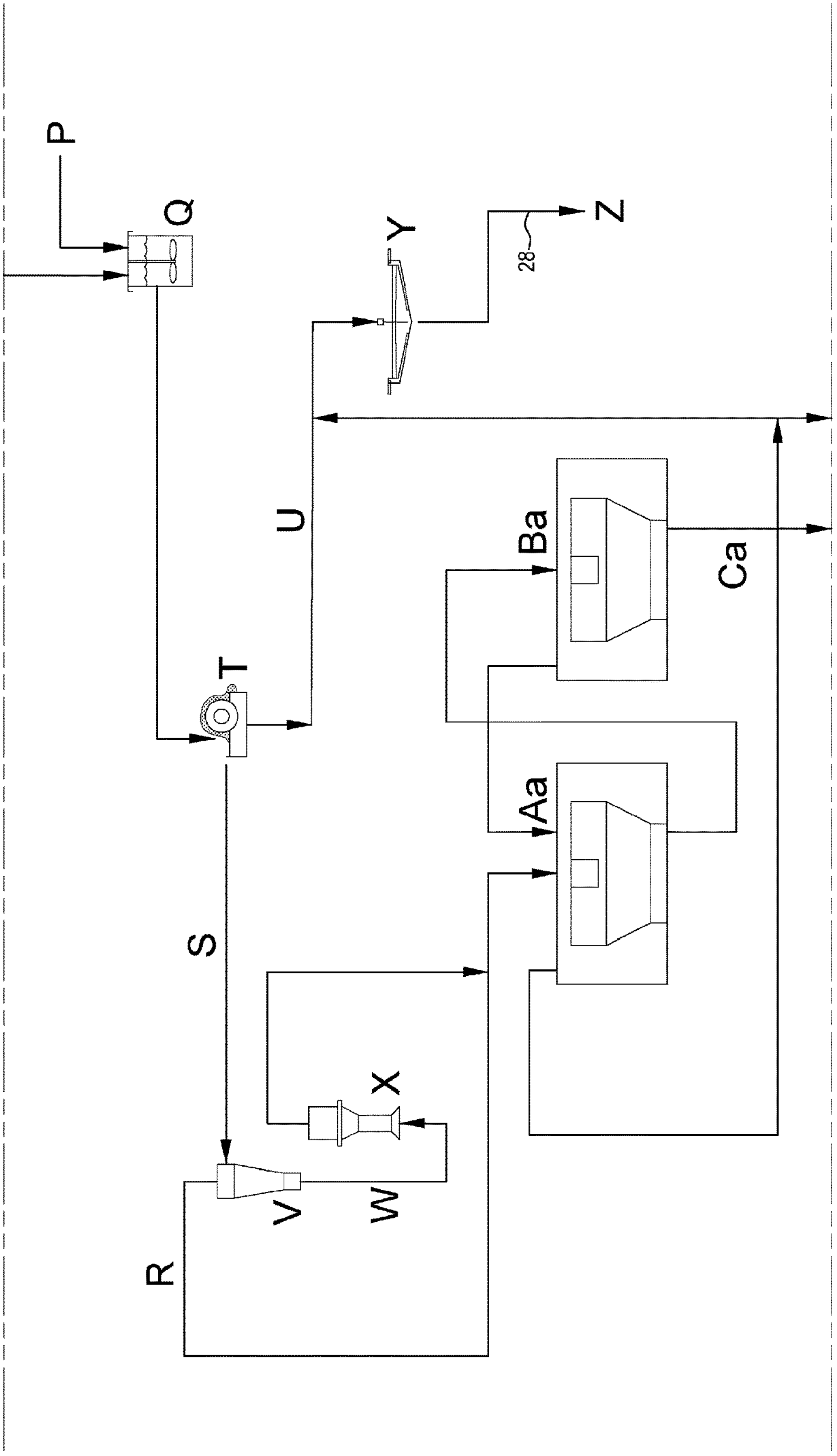
Figure 1:
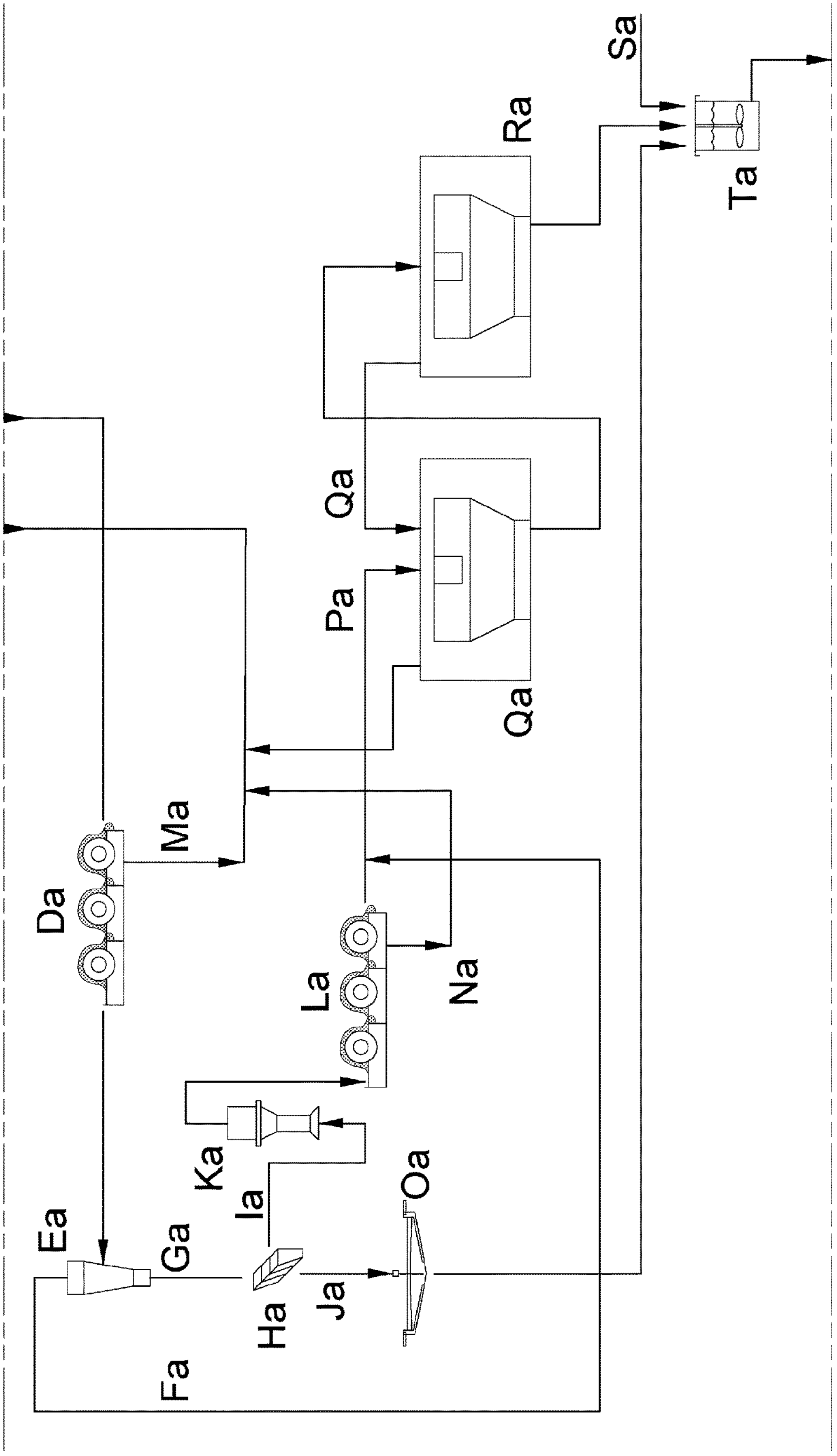
Figure 1:
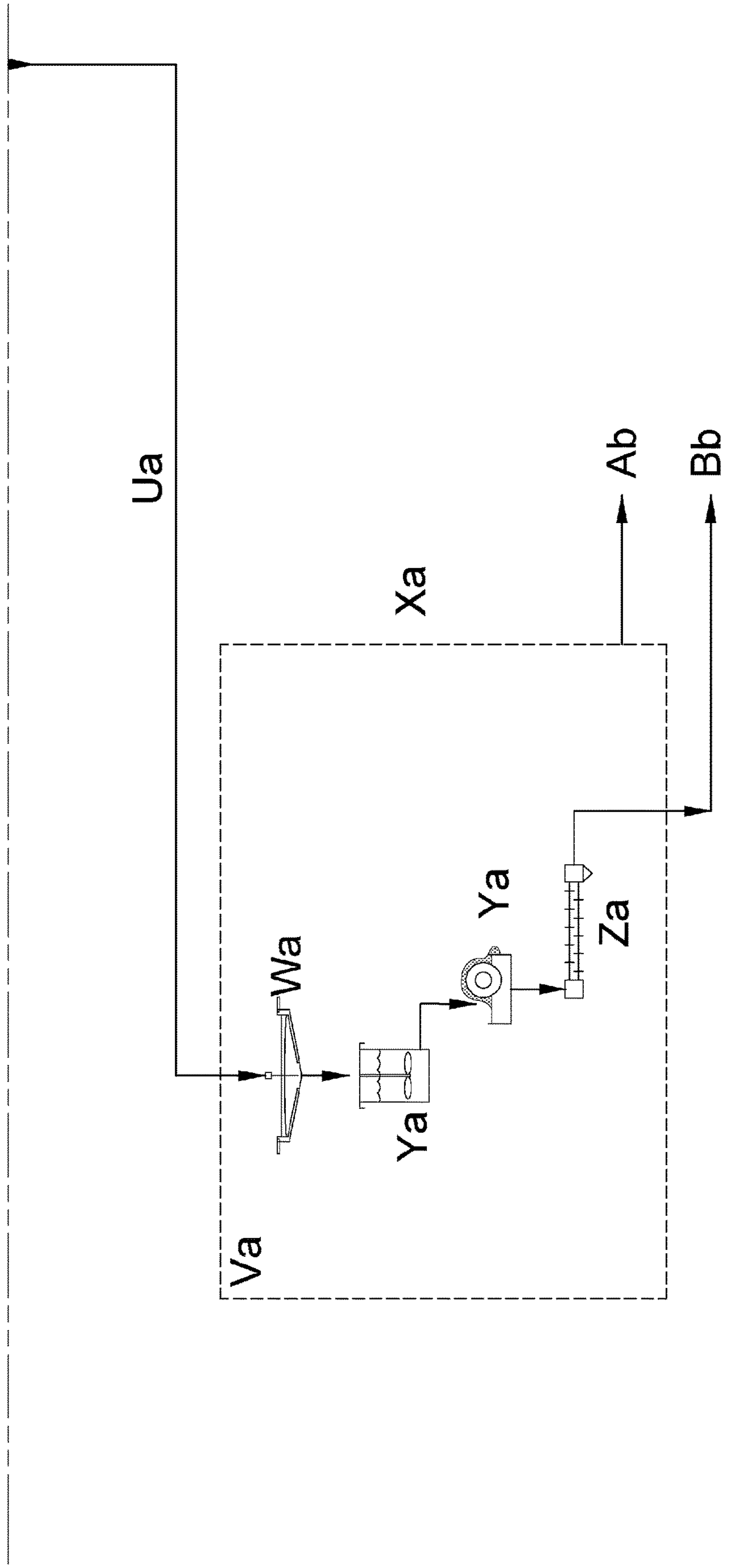
Figure 2:
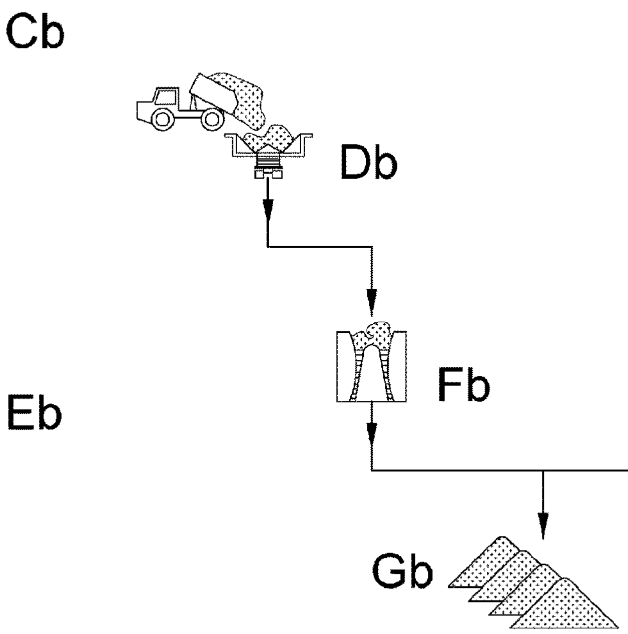
FIG. 2 shows Modules 1 and 2.
Figure 3:
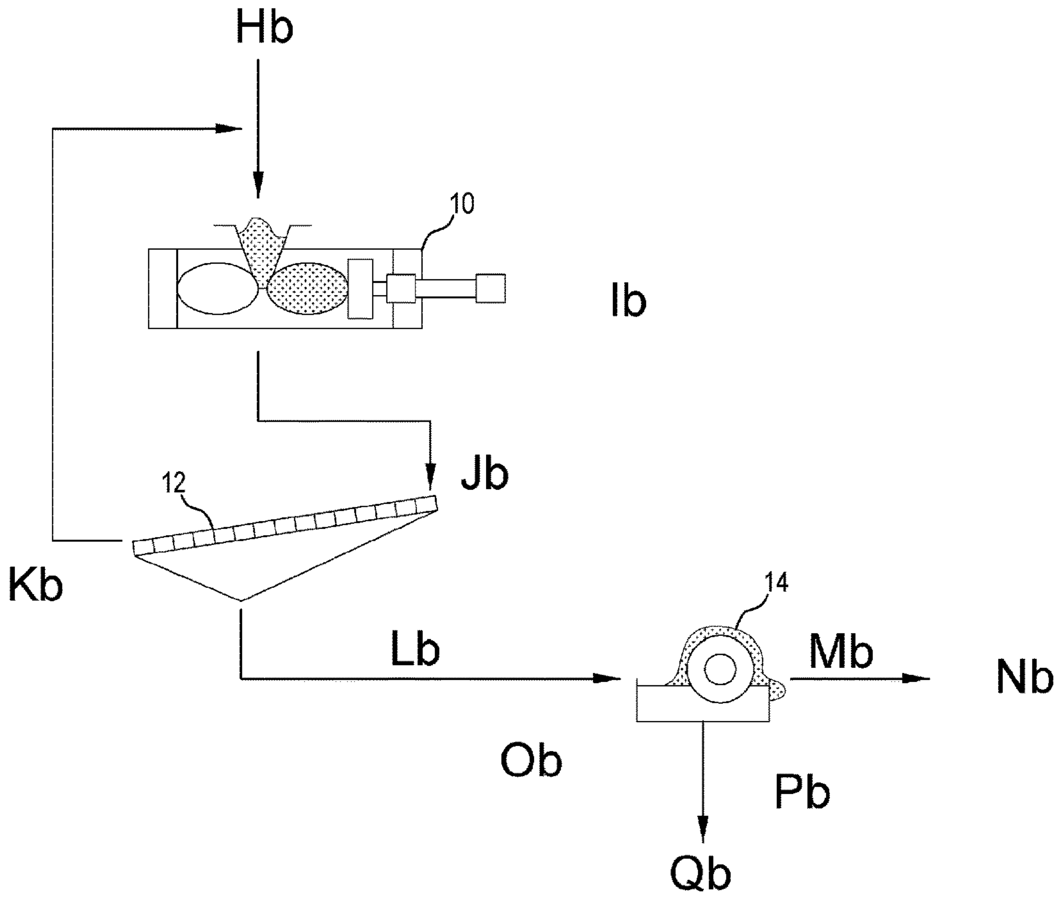
FIG. 3 shows Module 3.

FIG. 1 shows the Stage 2 processing in its entirety, whereas FIG. 2 shows primary crushing and secondary crushing in Modules 1 and 2. Turning to FIG. 3, there is shown a method of processing magnetite iron ore, including the step of using a high pressure grinding roller (HPGR) 10 to crush the magnetite. It is to be noted that the high pressure grinding roller 10 is used in a tertiary crushing mode rather than in a grinding mode.

In the example depicted, the step of using a high pressure grinding roller 10 crushes the magnetite from a feed particle size distribution of at least 80 mm to a feed particle size distribution of 8 mm. More preferably, the step of using a high pressure grinding roller 10 crushes the magnetite from a feed particle size distribution of at least 80 mm, 100% passing ($F_{100}$80 mm), to a feed particle size distribution of 8 mm, 100% passing ($F_{100}$8 mm).

In the case of one particular make/model of machine, the step of using a high pressure grinding roller 10 may include using the high pressure grinding roller 10 with 2.4 m diameter×2.2 m wide roll operating at 4 $N/mm^2$ pressure and 2.7 m/s roll speed.

The method may further include the step of using a dry screen 12 to generate a consistent product, and the step of using a dry magnetic separation unit (DMS) unit 14 to discard non-magnetic materials. The dry magnetic separation unit 14 may have a composite fabrication drum to avoid overheating caused by an eddy current phenomenon in a steel drum.

Figure 4:
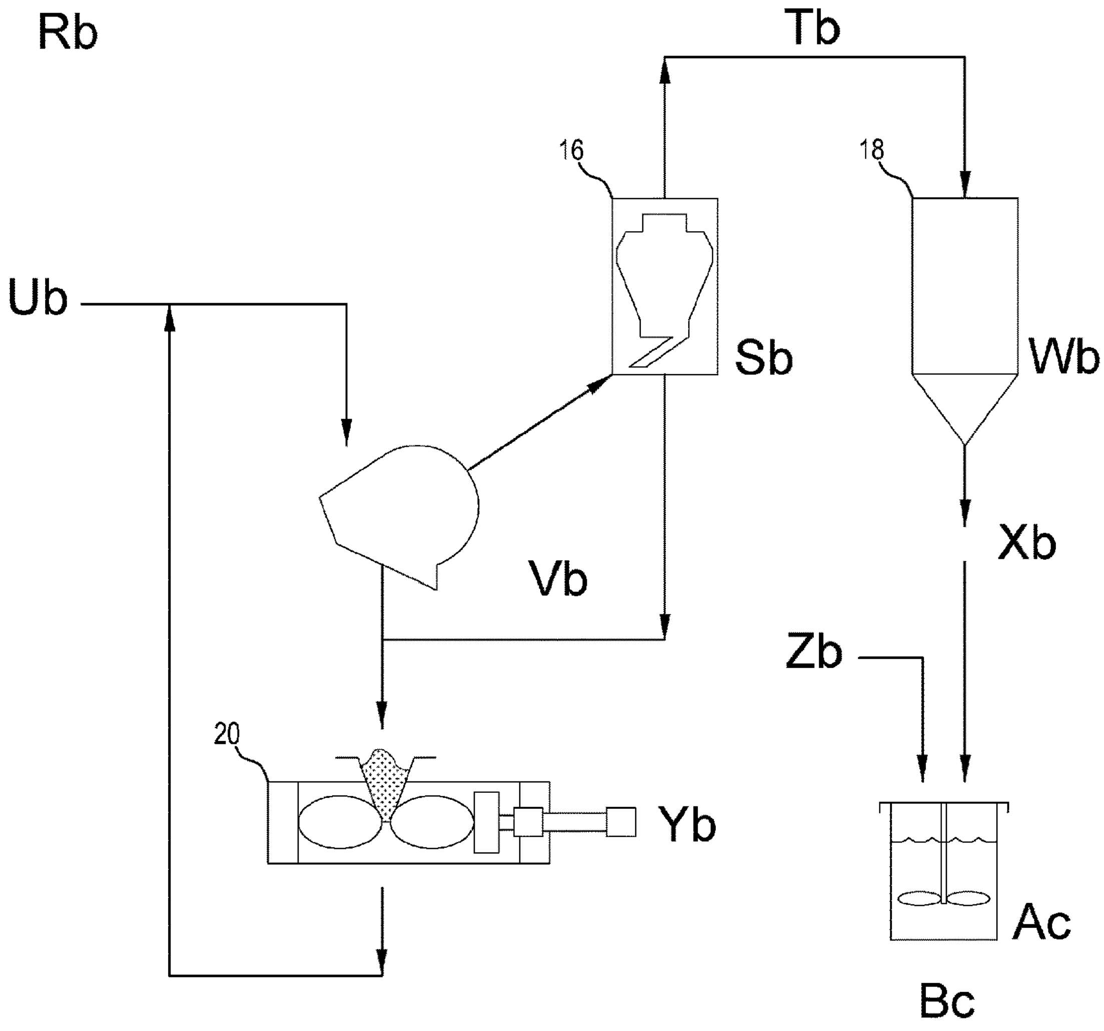
FIG. 4 shows Module 4.

Turning to FIG. 4, the method may further include the step of passing the particles through an air classifier 16 which separates fines which are fed to a bag house 18 from coarse particles which are fed back to a further high pressure grinding roller 20 for grinding the particles from $F_{100}$6-8 mm to $P_{80}$60-100 μm.

In another aspect, there is provided an apparatus for processing magnetite iron ore, including a dry magnetic separation (DMS) unit 14 having a composite fabrication drum, the dry magnetic separation unit 14 being for discarding non-magnetic materials.

In FIG. 3, the apparatus for processing magnetite iron ore includes a high pressure grinding roller (HPGR) 10 to crush the magnetite. The apparatus for processing magnetite iron ore includes a dry screen 12 for separating undersize particles from oversize particles which are recycled back through the high pressure grinding roller 10.

In FIG. 4, the apparatus for processing magnetite iron ore includes a further high pressure grinding roller (HPGR) 20 for grinding the particles from $F_{100}$6-8 mm to $P_{80}$60-100 μm and an air classifier 16 for separating material which is to be extracted from material which is to be fed back to the further high pressure grinding roller 20 for additional grinding.

Figure 8:
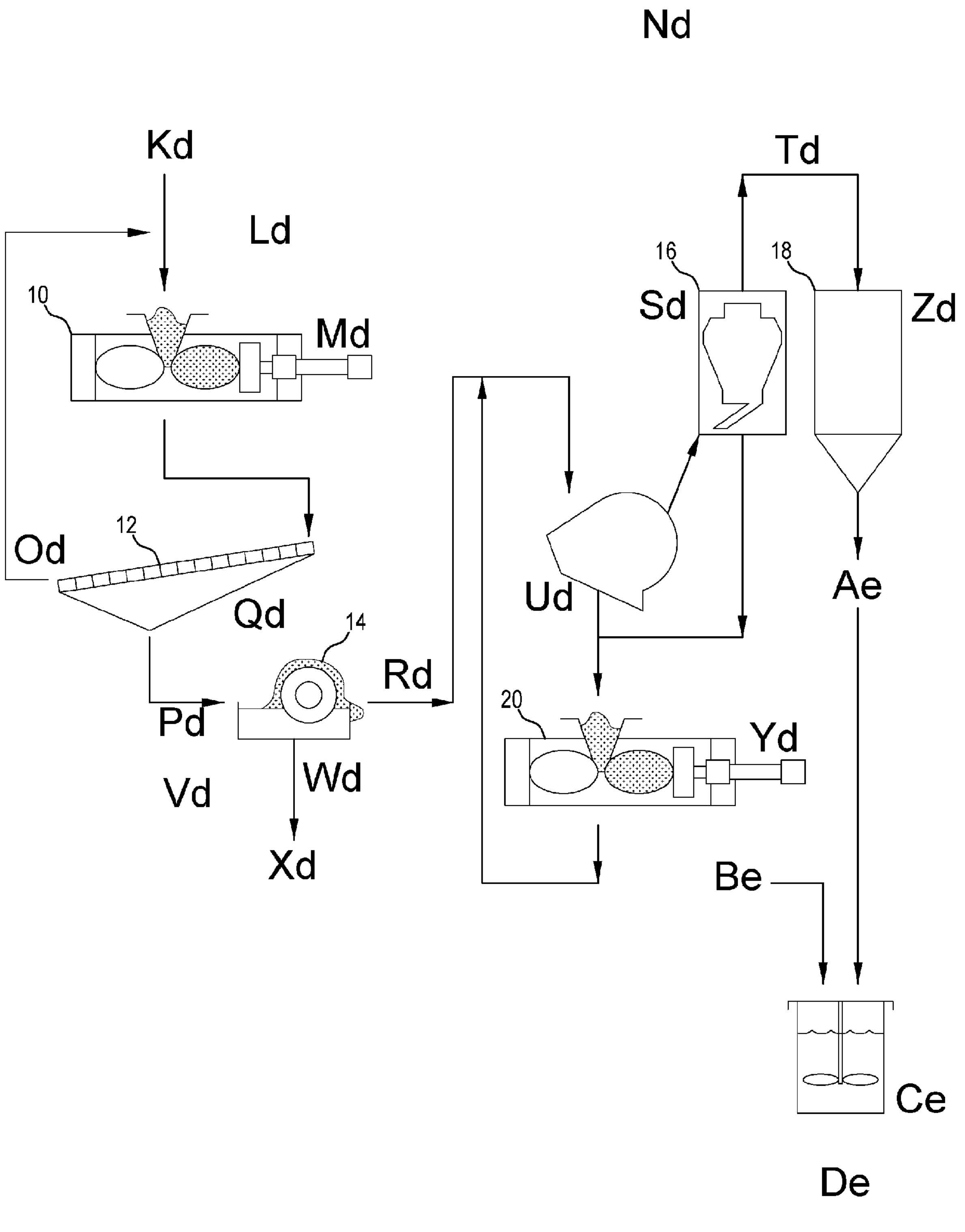
FIG. 8 shows Modules 3 and 4 combined.

Turning to FIG. 8 which shows Modules 3 and 4 combined, in another aspect, there is provided an apparatus for processing magnetite iron ore, including a first high pressure grinding roller 10 for crushing the magnetite, a dry screen 12 for selectively feeding back material to the first high pressure grinding roller 10, an air classifier 16, for selectively feeding back, coarse material to the second high pressure grinding roll 20, a second high pressure grinding roll 20 to further grind the magnetite material for return back to the air classifier 16, and a dry magnetic separation (DMS) unit 14 for discarding non-magnetic materials, wherein the dry magnetic separation unit 14 is outside the two feedback loops associated with the first and second high pressure grinding rollers 10, 20.

With reference to FIG. 9, there is also disclosed an apparatus for processing magnetite iron ore in the form of Modules 5A and 5B, including an upstream cyclone 22 and a mill 24 for grinding particles, wherein the upstream cyclone 22 is arranged to operate as a splitter by diverting material in an overflow of the upstream cyclone 22 to bypass the mill 24 and by feeding material in an underflow of the upstream cyclone 22 to the mill 24.

The mill 24 may be in the form of a High Intensity Grinding mill (HIGmill). The mill 24 may be arranged in the apparatus without any feedback path to the mill 24.

In one form, the cyclone 22 is arranged to divert approximately 25% of material to bypass the mill 24. The cyclone 22 may be arranged to divert finely ground material around the mill to prevent overgrinding feed material, and thus reducing the overall mill power consumption. The mill may be configured to operate in a comparable low energy grind mode, where difficult particles are allowed to pass through the open circuit configuration at above the target grind size to be processed and/or discarded through later processing steps.

As shown in FIG. 9, the apparatus includes a downstream deslime thickener 26 (and possibly more than one), wherein the downstream deslime thickener 26 is fed material from the mill 24 and from the upstream cyclone overflow. More preferably, the downstream deslime thickener 26 is arranged to deslime material from the mill 24 and from the upstream cyclone 22 overflow at a rise rate to discard silica and non-magnetic materials.

In one particular form, the downstream deslime thickener is arranged to deslime material from the mill 24 and from the upstream cyclone 22 overflow at a rise rate to discard silica and non-magnetic materials at relatively low magnetic material losses compared to mass loss. Specifically, the downstream deslime thickener 26 may be arranged to deslime material from the mill 24 and from the upstream cyclone 22 overflow at a high rise rate of 8-10 m/h to discard silica and non-magnetic materials at relatively low magnetic material losses compared to mass loss.

The downstream deslime thickener may be arranged such that an overflow from the downstream deslime thickener 26 is diverted to a tailings storage facility 28 whereas an underflow from the downstream deslime thickener 26 is fed onward for further processing.

Also as shown in FIG. 9, the apparatus includes a magnetic separator 30 arranged to send magnetic material to said upstream cyclone 22 and to divert non-magnetic material to the tailings storage facility 28. More preferably, said magnetic separator 30 provides wet magnetic separation.

In another aspect, there is an apparatus for processing magnetite iron ore, including a mill 24 for grinding ore particles, wherein the mill 24 is in the form of a High Intensity Grinding mill (HIGmill).

With reference to Module 5C shown in FIG. 10, there is also disclosed an apparatus for processing magnetite iron ore, including a screen 32 (which may be in the form of a High Frequency Vibrating screen) arranged to send oversize material to a regrind mill 34 and undersize material to a high grade concentrate thickener 36.

The high grade concentrate thickener 36 is arranged to divert overflow to the tailings storage facility 28 and to feed underflow to a filter feed tank 38. All material from the regrind mill 34 is fed to a magnetic separator 40 which diverts non-magnetic material to the tailings storage facility 28 and feeds magnetic material to one or more deslime thickeners 42.

The one or more CCD deslime thickeners 42 are arranged to divert overflow to the tailings storage facility 28 and to feed underflow to the filter feed tank 38. The apparatus includes a cyclone separator 44 arranged to feed overflow to said one or more deslime thickeners 42, and to feed underflow to said screen 32 for screening. The apparatus provides accordingly a product upgrade circuit whereby percentage by mass content of iron is able to be increased to guarantee a specific grade.

In one form, the apparatus may provide a product upgrade circuit whereby percentage by mass content of iron is able to be increased to guarantee a grade of at least 67% by weight content of iron (Fe).

The high grade concentrate thickener 36 may be able to provide a high grade magnetite product, for example 25% of total product at a Fe grade of at least 68%.

The product upgrade circuit is able to minimise additional grinding by processing only 15-20% of material fed to the cyclone separator 44 and ensures a final concentrate product is at $P_{98}$ of 45 μm (screen) to achieve target grade of at least 67% Fe and less than 6% $SiO_2$.

Figure 11:
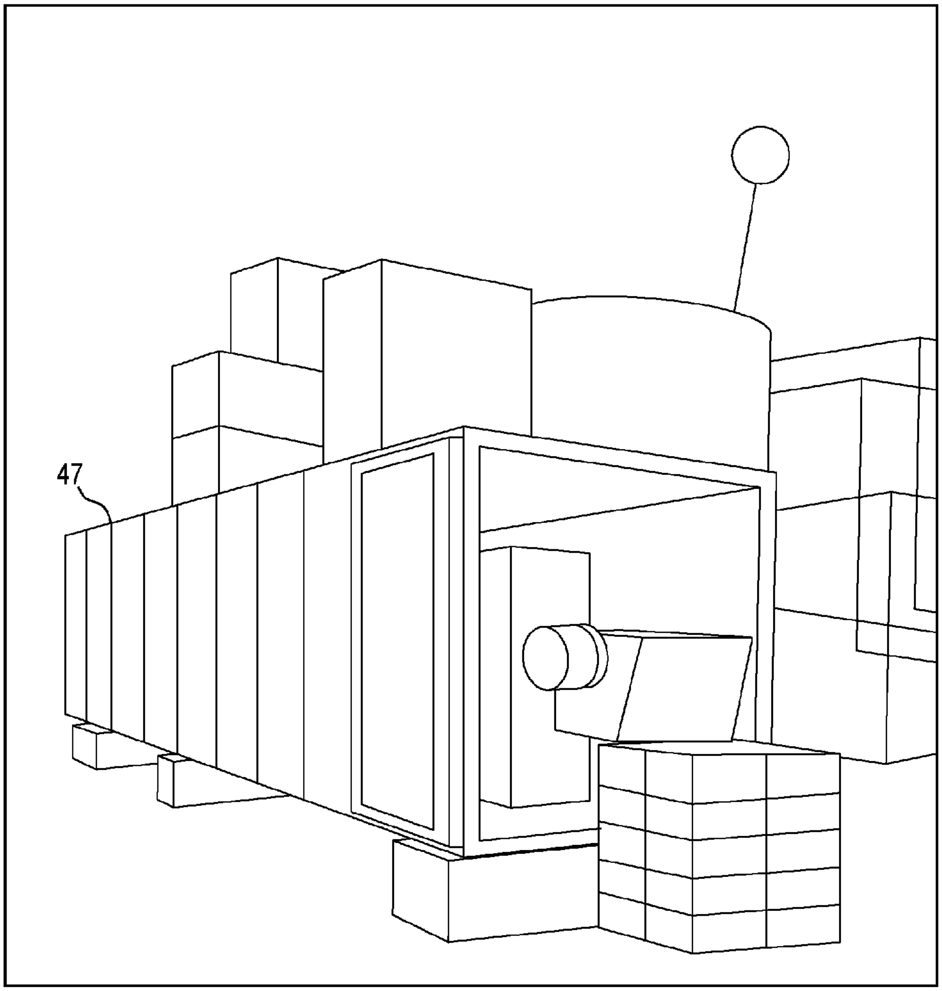
Figure 12:
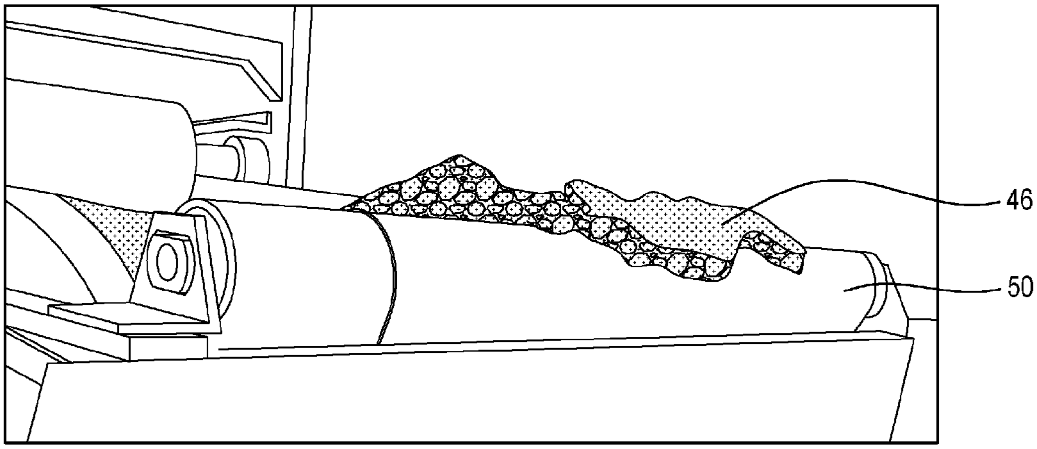
Figure 13:
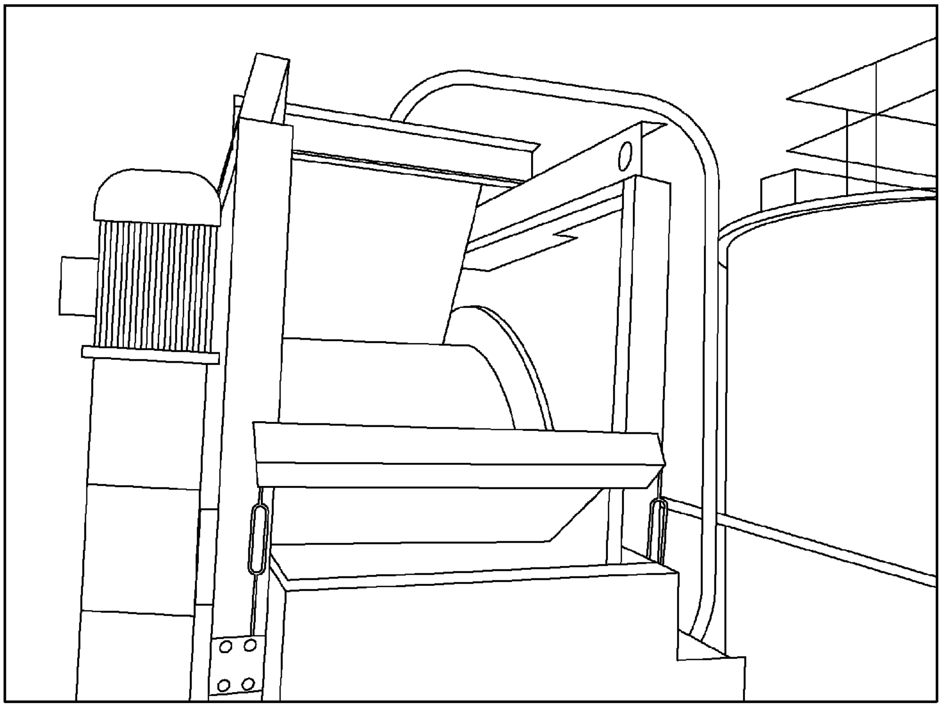
Figure 14:
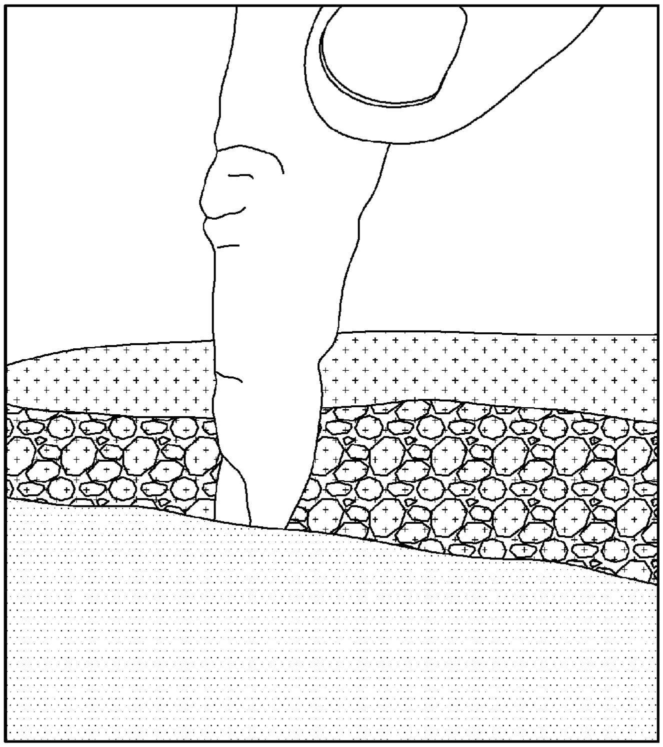
Figure 15:
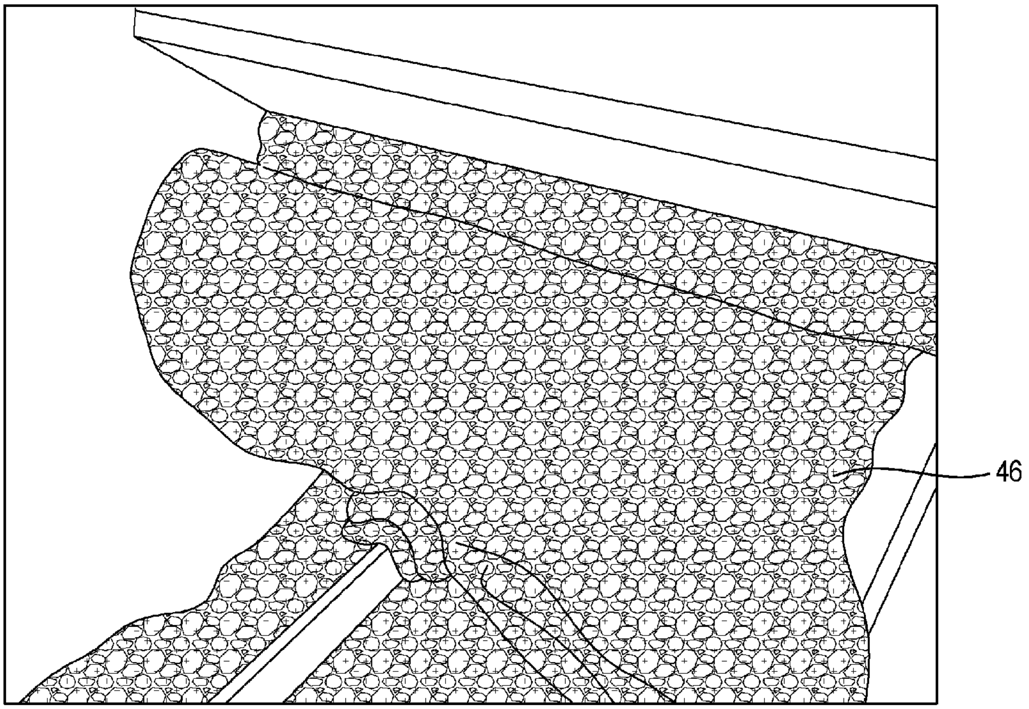
Figure 16:
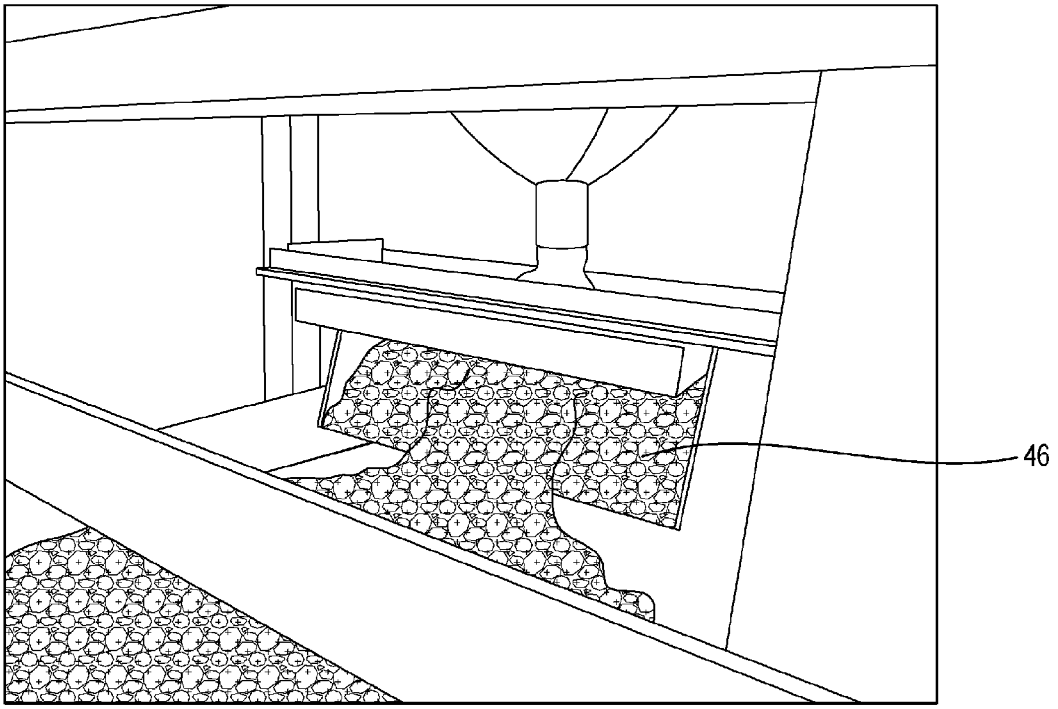
Figure 17:
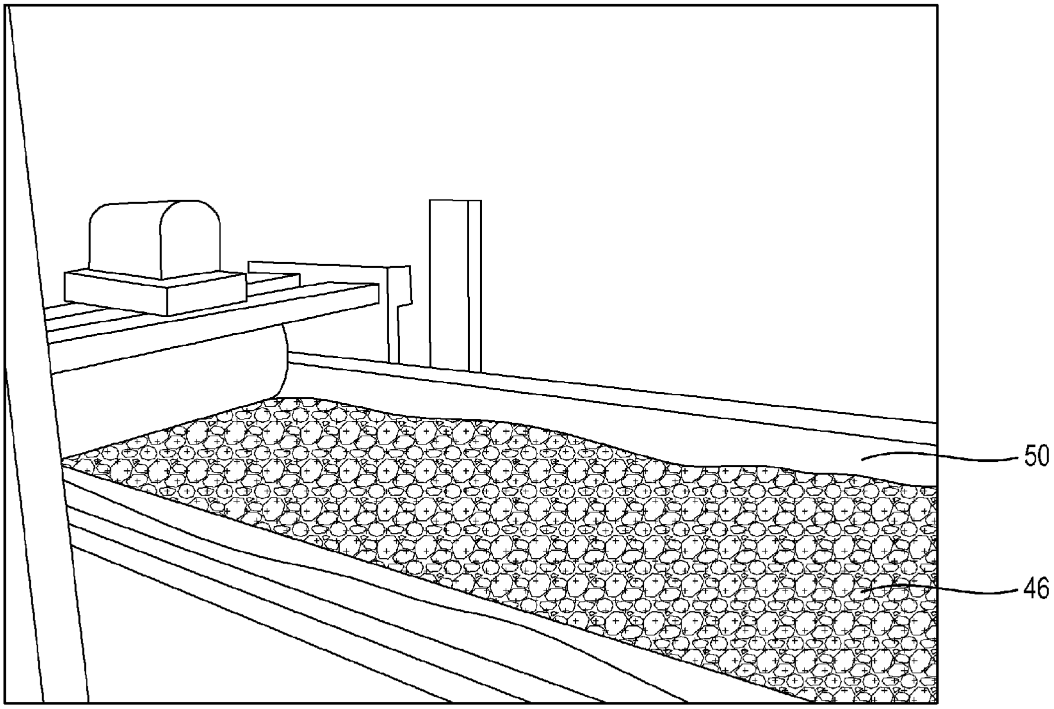
Figure 18:
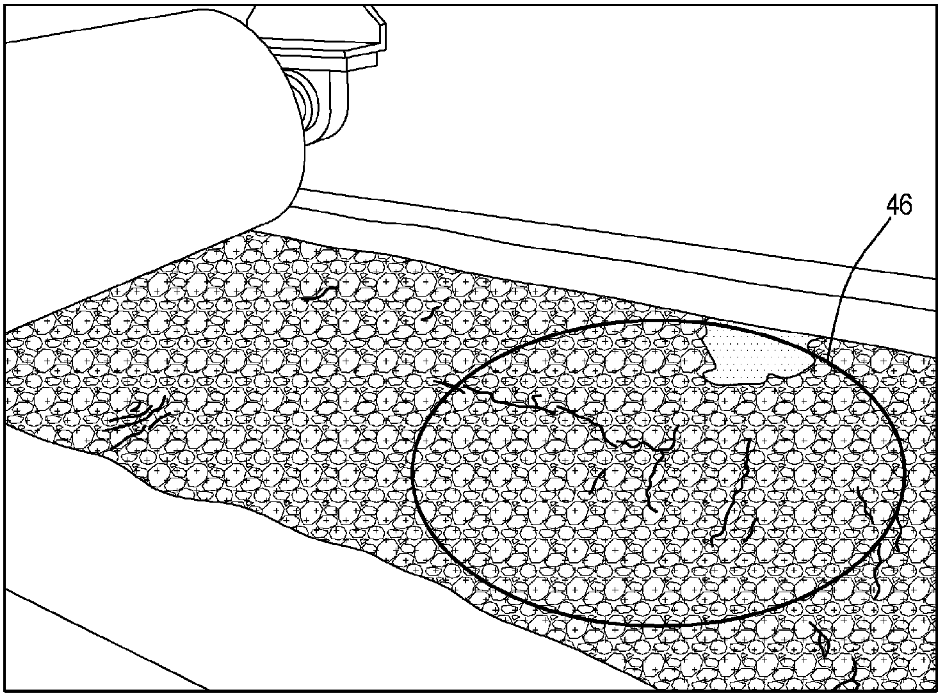

With reference to FIGS. 11 to 18, there is also disclosed a method of dewatering magnetite 46, including the step of extracting water from the magnetite 46 by virtue of the magnetism of the magnetite 46, whereby the magnetite 46 pulls together under magnetic attraction thereby squeezing water outwardly and away from the magnetite 46. FIG. 11 shows a container 47 where the method may be carried out, whereas FIGS. 12 to 18 show more specifics of the dewatering apparatus.

The method may include the step of using a magnetic drum 48 (see FIGS. 13 and 15) to cause the magnetite 46 to compress itself toward the drum 48, thereby expelling water from the magnetite 46. The drum 48 may be arranged such that the magnetite 46 material peels away from the magnetic drum 48 under gravitational force after expelling water. In one form, the magnetite 46 may be fed along a belt filter 50 which allows water to drop downwardly from the magnetite 46 and through the belt filter 50.

There is also disclosed an apparatus for dewatering magnetite, including a magnetic drum 48 arranged to cause the magnetite to compress itself toward the drum 48, thereby expelling water from the magnetite.

The apparatus may include a conveyor belt filter 50 arranged such that magnetite conveyed along an upper surface of the belt filter 50 will compress itself downwardly under magnetic attraction within the magnetite such that water is expelled from the magnetite and drains through the conveyor belt filter 50.

More preferably, the apparatus is configured to achieve a target moisture content of less than or equal to 10% w/w.

EXAMPLE

1. Glossary

TABLE 1

| Abbreviation | Definition |
|---|---|
| | Glossary of Terms |
| BBWi | Bond Ball Work Index |
| CCD | Counter Current Decantation |
| CHF | Concentrate Handling Facility |
| COS | Coarse Ore Stockpile |
| CWi | Crushing work index |
| DMS | Dry Magnetic Separation |
| dt/h | dry tonnes per hour |
| DTR | Davis Tube Recovery |
| $F_{80}$ | Feed Particle Size Distribution - 80% passing |
| Fe | Iron |
| FORTESCUE/FMG | Fortescue Metals Group Ltd |
| G | Gauss |
| g/t | grams per tonne |
| HPGR | High Pressure Grinding Roll |
| kg | Kilograms |
| km | Kilometre |
| kW | Kilowatts |
| kWh/t | Kilowatt hours per tonne |
| µm | micrometres |
| m | Metres |
| $m^3/h$ | Cubic metres per hour |
| mFe | Magnetic Iron |
| mm | Millimetre |
| Pa | Pascals |
| Mtpa | Million tonnes per annum |
| dMtpa | dry Million tonnes per annum |
| O/F | Overflow |
| O/S | Oversize |
| $P_{80}$ | Product Particle Size Distribution - 80% passing |
| $P_{98}$ | Product Particle Size Distribution - 98% passing |
| ROM | Run of Mine |
| rpm | Revolutions per minute |
| $SiO_2$ | Silica |
| t/h | tonnes per hour |
| $t/m^2h$ | Tonnes per square metres per hour, referring to specific settling rate |
| TSF | Tailings Storage Facility |
| U/F | Underflow |
| U/S | Undersize |
| VS | Variable Speed |

TABLE 1-continued

| Abbreviation | Definition |
|---|---|
| | Glossary of Terms |
| VSD | Variable Speed Drive |
| w/w | Weight/weight |
| WMS | Wet Magnetic Separation |

2. North Star Stage 2 Plant

The Stage 2 plant is designed to process 62.5 Mtpa ROM feed at a DTR MR of 32% to produce 20 dMtpa magnetite concentrate product containing 67.1% Fe and 5.6% $SiO_2$ at a nominal $P_{80}$ of 30 µm, with a magnetic Fe recovery of 100% (in comparison to lab DTR testwork results of the ROM feed).

The main Process Plant consists of the following dry and wet plant facilities:

Primary crushing
Secondary crushing
Tertiary HPGR crushing/screening
HPGR grinding/air classification
Fine grinding with magnetic separation and deslime
CMS concentrate upgrade circuit
Concentrate and tailings thickening
Overland pipeline to port
Concentrate filtration and storage facility at port.

2.1 Overall Process Flowsheet

Extensive test work programs and process modelling has been conducted over more than 5 years to establish and validate the basis of design for the process flow sheet. This testing has utilised material from diamond core drilling as well as initial mining operations.

Extensive laboratory and vendor tests has been validated and confirmed by the operation of the Stage 1 demonstration plant and the pilot plant at site configured to the Stage 2 flowsheet.

The North Star, Eastern Limb and Glacier Valley low moisture ore bodies enable a dry process using two-stage crushing, HPGRs, screening and air-classifiers, replacing the more conventional (and higher-energy) wet process of ball-milling and cycloning. The use of higher efficiency stirred regrind mills for subsequent wet processing further reduces energy consumption.

Based on operating data from the Stage 1 Demonstration Plant and extensive test work in vendor labs and at the North Star Pilot Plant, the Stage 2 Flowsheet was developed designating the plant into the following seven modular areas:

Module 1 Primary Crushing
Module 2 Secondary Crushing
Module 3 Tertiary Crushing
Module 4 Grinding
Module 5 Fine Grinding
Module 6 Tailings
Module 7 Dewatering (Port)

The overall Stage 2 processing Flowsheet is shown in FIG. 1.

2.2 Process Plant

The Stage 2 Process Plant is designed to process 62.5 Mtpa ROM feed at a ROM feed DTR MR of 32% to produce 20 Mtpa magnetite concentrate product containing 67.1% Fe and 5.6% $SiO_2$.

Table 3 shows a summary of the major equipment for the Stage 2 Plant.

TABLE 3

Stage 2 Major Equipment Summary

| Equipment | Details | Number of Units | Installed Power (kW) per unit |
|---|---|---|---|
| Primary Crushers | 63"-130" (1.6 m-3.3 m) semi mobile gyratory crusher for maximum feed size of 1,250 mm | 2 | 1,500 |
| Secondary Crushers | 1,050 kW cone crushers for maximum feed size of 400 mm | 6 | 1,050 |
| Screens | 3.6 m wide × 7.3 m long banana screens | 10 | 90 |
| Tertiary Crushing HPGRs | 2.4 m diameter × 2.2 m wide roll operating at 4 $N/mm^2$ pressure and 2.7 m/s roll speed | 4 | 2 × 5,100 or 5,700 |
| Dry Magnetic Separators | Single drum 1.22 m diameter × 4.0 m, 3000 Gauss | 20 | 7.5 |
| Air Classifiers - Static/Dynamic | 6.1 m diameter, 0.76 $Mm^3/h$ | 12 | 2,520 |
| Baghouses | Full size - 25,000 $m^2$ cloth area, | 6 | 1,056 |
| Primary Grinding HPGRs | 2.2 m diameter × 2.0 m wide roll operating at 4 N/mm2 pressure and 2.0-2.2 m/s roll speed | 8 | 2 × 3,400 |
| Rougher Wet Magnetic Separators | Single drum 1.2 m diameter × 3.05 m, 1150 Gauss | 64 | 11 |
| Upstream Cyclones | 250 mm diameter, 8 clusters of 16 cyclones each | 128 | N/A |
| Fine Grinding Mills | HIGmill 5000 (2.4 m dia, 50,000 litres) | 8 | 5,000 |
| Deslime Thickeners | 4 + 1 17 m dia CCDs | 5 | N/A |
| Cleaner Wet Magnetic Separators | Triple drums each 1.2 m diameter × 3.05 m, 1000 Gauss | 48 | 33 |
| Cons Cyclones | 250 mm diameter, 4 clusters of 22 cyclones each | 88 | N/A |
| High Frequency Vibrating Screens | High Frequency Vibrating Multifeed 48-90MS-3 screen with three SWG48-30DF280 steel sandwich panels | 88 | 1.8 |
| Regrind Mills | HIGmill 5000 (2.4 m dia, 50,000 litres) | 2 | 5,000 |
| ReCleaner Wet Magnetic Separators | Triple drums each 1.2 m diameter × 3.05 m, 1000 Gauss | 7 | 33 |
| Concentrate Cleaner/Thickeners | 2 + 1 17 m dia CCDs | 3 | N/A |
| High Grade Concentrate Thickener | 26 m diameter high rate thickener | 1 | 15 |
| Tailings Thickener | 69 m diameter high rate thickener | 3 | 30 |
| Tailings Transfer Pumps | centrifugal pumps | 10 | 1,680 |
| Concentrate Transfer Pumps | positive displacement pumps | 4 | 1,060 |
| Concentrate Thickener (Port) | 50 m diameter high rate thickener | 1 | 30 |
| Concentrate Filters (Port) | Dewatering drums w/Vacuum Belt Filters | 8 | 40 |

3. Process Description

3.1 Module 1—Primary Crushing ($F_{100}$ 1.2 m to $P_{100}$ 400 mm)

From the mining operations' prepared ROM fingers, ROM ore is loaded into Caterpillar 793F or equivalent rear tipping dump trucks and hauled to two gyratory type Primary Crushers. The Primary Crushers receive ore with an average $F_{80}$ size of 310 mm (based on heavy ANFO blast modelling) and at an average moisture of 0.6%. Based on a design CWi of 21 kWh/t, two primary crushers are each capable to provide a crushed product with a $P_{80}$ of 140-160 mm that is conveyed to downstream secondary crushing in Module 2.

At the on-stream utilisation of approximately 76.5% (6700 h/a), each primary crusher will nominally process 4,630 t/h of material and have a design throughput rate of 6,600 t/h. This extra capacity allows for mining to feed each primary crusher (and subsequent downstream secondary crushers) from a 50/50 split ratio up to a maximum 60/40 split ratio.

Refer to FIG. 2.

3.2 Module 2—Secondary Crushing ($F_{100}$ 400 mm to $P_{100}$ 80 mm)

Secondary Crushing aims to reduce the size of the Primary Crusher product prior to sending the material to the Coarse Ore Stockpiles (COS). Six cone type Secondary Crushers each operate at a nominal throughput rate of 1,540 t/h with an on-stream utilisation of 76.5%. Ore is discharged from the crushers at a $P_{80}$ of 40 mm to 45 mm and is sent to the COS. The COS consists of four stockpiles that allows the material to be stacked according to target mass recovery ranges (low, medium and high). A moving average time lag of data from on-line magnetic analysis will assist the radial stacker to direct the crushed material to the corresponding piles.

The COS serves as a break point between the upstream Modules 1 and 2 (on-stream utilisation of 76.5%) from the rest of the plant which operates with an on-stream utilisation of 84.5% by providing up to 12 hr of live storage prior to requiring dozers to push the material forward for downstream processing. Four apron feeders under the COS fine-tune the blend to ensure a uniform mass recovery feed to the downstream Module 3.

See FIG. 2: Modules 1 and 2.

3.3 Module 3 Tertiary Crushing ($F_{100}$ 80 mm to $P_{100}$ 8 mm)

Tertiary crushing by HPGR was introduced to the North Star 2 flowsheet to allow a consistent, fine feed to primary grinding. Secondary crushed ore from the coarse ore stockpile ($F_{100}$ 80 mm) is fed to the HPGR crushing circuit to generate a minus 6 to 8 mm product. Four crushing HPGRs are closed with ten dry double deck banana screens to generate a consistent product. For the 20 Mtpa concentrate production flowsheet, 8,340 t/h ore exits the screen undersize at a $P_{80}$ of 4.2 mm after being passed through the Module 3 HPGRs 2.25 times and crushed from a feed $F_{80}$ of 43 mm.

The screen undersize is then fed to twenty dry magnetic separation (DMS) units to effectively discard silica and non-magnetic materials prior to being sent to further downstream primary grinding. The flowsheet top size of 8 mm has been selected based on IBO plant data and testwork. Consequently, the DMS operation will process the 32% MR feed over a 3000G rare earth type dry drum and reject 17% of the total mass (primarily silica and other non-magnetics) with a low magnetics loss of 1.5%. Refer to FIG. 3.

For the 20 dMtpa concentrate production flowsheet, DMS rejects equates to 10.5 dMtpa material with a nominal composition of 16.3% Fe and 51.8% $SiO_2$ being sent to dry tails stacking. See FIG. 3: Module 3.

3.4 Module 4—Primary Grinding (F100 6-8 mm to $P_{80}$ 60-100 μm)

Eight HPGRs in grinding service operate in closed circuit with air classification to produce a $P_{80}$ of 80 μm product to feed the wet plant. The HPGR product discharge is targeting 20% by mass of the discharge product to be ≤80 μm when receiving a feed with a BBWi of ≤20.8 kWh/t and operating at a circulating load of 490%.

Minus 6 mm Module 3 product material is conveyed with recirculated HPGR ground product to the Air Classifier Feed Bin. Ten air classification systems operate in parallel to remove fines generated from the HPGR product targeting a $P_{80}$ circa 80 For each AC system, ore is withdrawn from the base of the AC feed bin by a variable speed air classifier vibratory feeder to provide a constant feed rate to the Static Separators.

The air-classifier system is a three product separator, comprised of Static and Dynamic Separators. The Static section separates a "coarser fines" cut from the air classifier which is then air conveyed to the dynamic separator. Within the dynamic separator, the fines is further refined targeting an exit product to the baghouse at a $P_{80}$ of 80 μm and a top size of <2 mm. The coarse material discharging from the static and dynamic sections of the air classifiers are combined and sent to the HPGR Grinding Feed Bins.

The dynamic classifier product ($P_{80}$ 80 μm) fraction is recovered via a baghouse system and transported via covered conveyors to six, agitated Coarse Slurry tanks, where process water is added to slurry the fines to a solids density of 50% w/w. The slurry is then pumped to two agitated RMS Feed Tanks, where it is further diluted to a solids density of 30% w/w before being fed to the Rougher Wet Magnetic Separation Circuit. Refer to FIG. 4.

3.5 Module 5—Fine Grinding ($F_{80}$ 80 μm to $P_{80}$ 35 μm)

Figure 5:
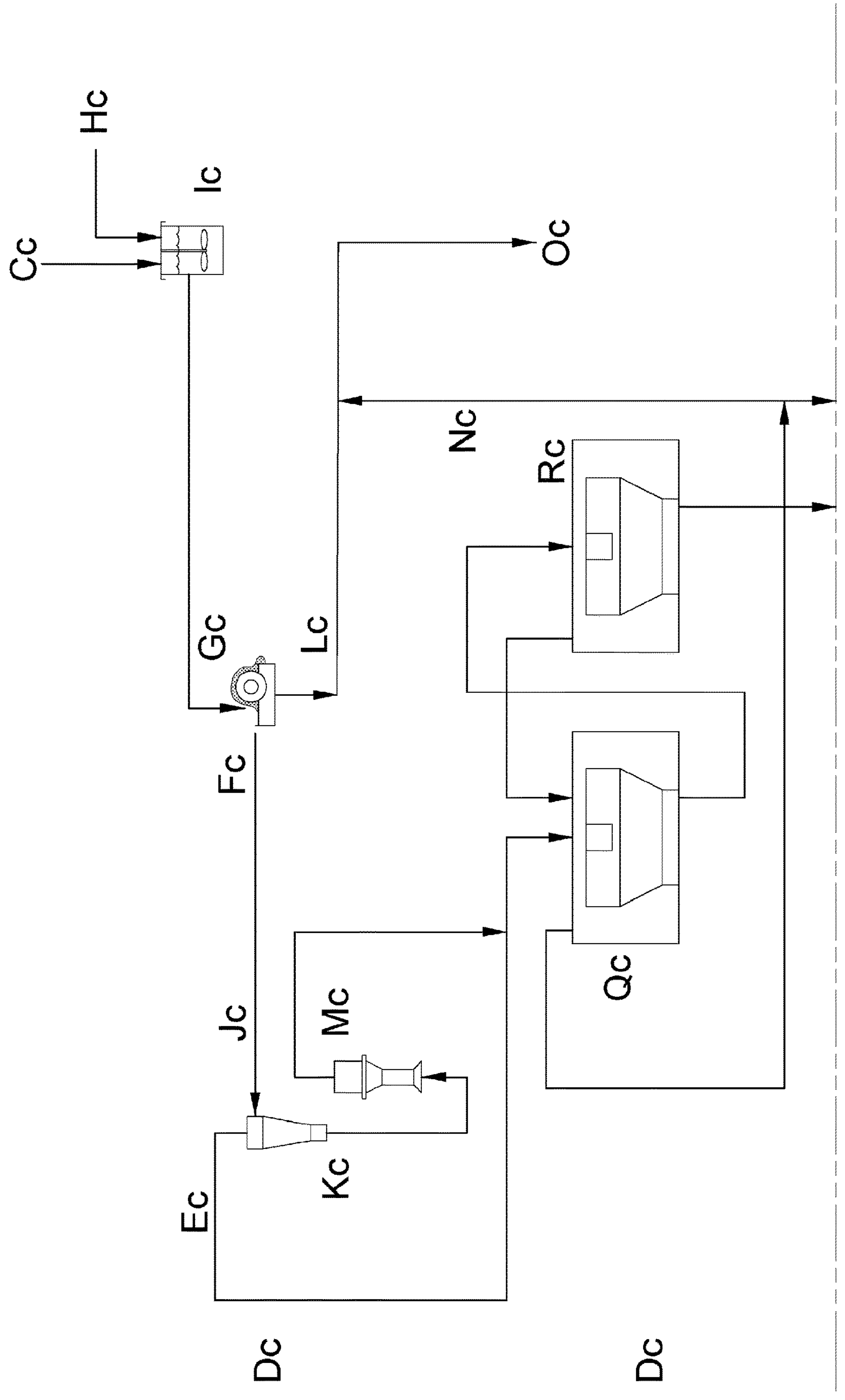
FIG. 5 shows Module 5, including Modules 5A, 5B and 5C.
Figure 5:
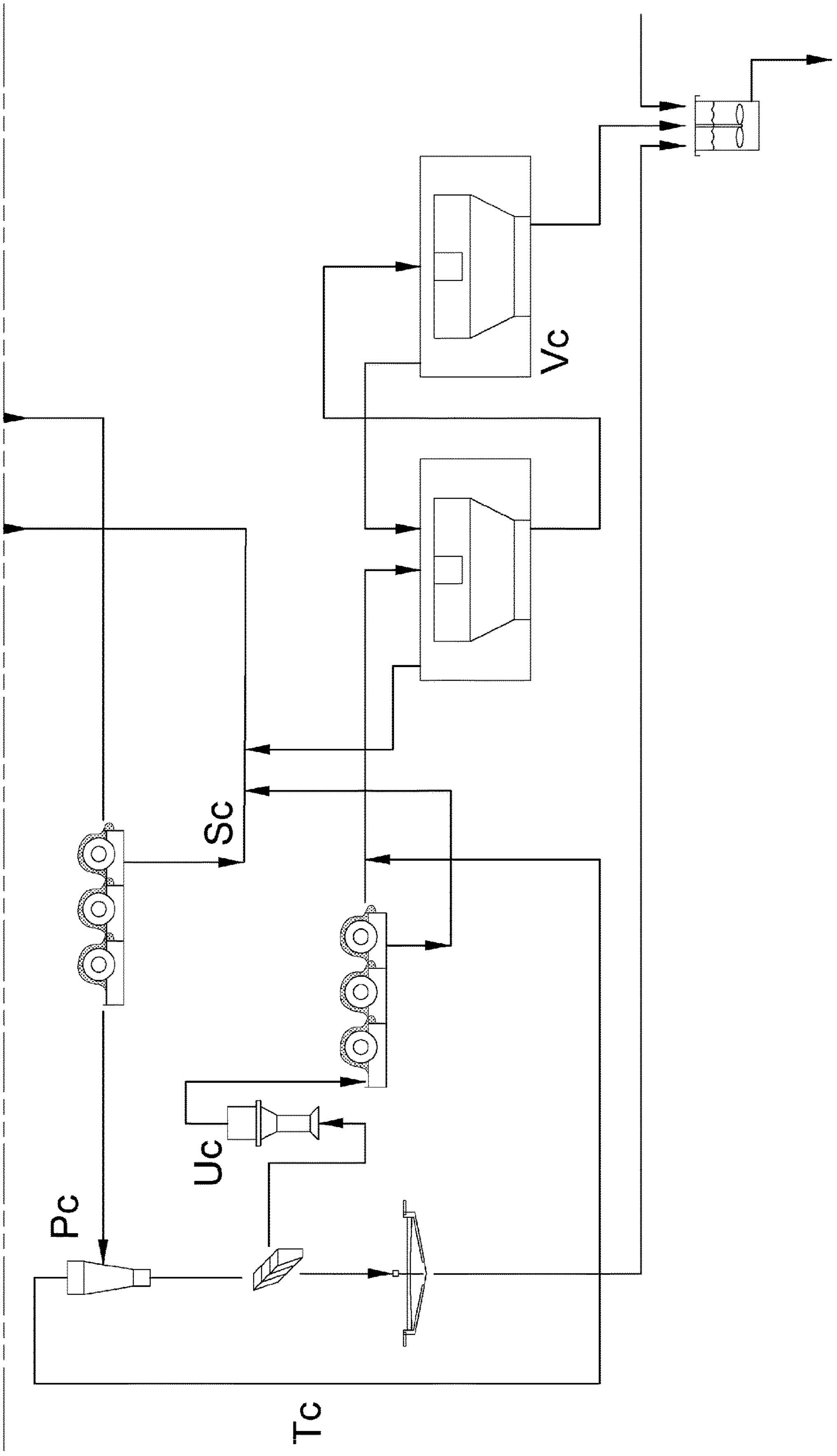

Module 5 consists of the wet concentration plant as depicted in FIG. 5.

The Module is further subdivided into the following:

- Module 5A—consists of rougher wet magnetic separation (WMS) and cyclone classification
- Module 5B—consists of fine grinding and desliming
- Module 5C—consists of cleaner wet magnetic separation (WMS) and a concentrate product upgrade circuit Within Module 5A, air classifier fines from Module 4 are pumped at a solids density of 30% w/w to the Rougher WMS (RMS) units. The RMS units are single drums with ceramic ferrite magnets operating at a magnetic intensity of 1150 G. For the 20 dMtpa concentrate production flowsheet, the RMS units reject 38% of the total mass to tails while limiting magnetic Fe (mFe) losses to 1.8%. The RMS cons are sent to hydrocyclones to remove fines material <$P_{80}$ of 35 μm (laser) prior to being sent to stirred mills that are designed to grind to a product size $P_{80}$ of 35 μm (laser). Consequently, 25% of the material sent to the hydrocyclones is sent to overflow and bypasses the stirred mills to reduce power consumption due to overgrinding.

Within Module 5B, open circuit stirred mills are used for grinding hydrocyclone underflow at a $F_{80}$ of 105 μm (screen) to produce a product $P_{80}$ of 35 μm (laser) and consuming 9 kWh/t of power. The fine ground product is then combined with the hydrocyclone overflow and sent to the de-sliming circuit.

A 2-stage de-slime circuit operates at high rise rates (8-10 m/h based on O/F) to allow significant removal of low density, high silica content solids (up to 22% mass at 59 to 63% $SiO_2$ concentration) while limiting mFe losses to 1.5% prior to being sent to the CMS circuit. For the 20 dMtpa concentrate production flowsheet, five CCDs are proposed (4 in parallel followed by 1 in series) for the de-slime circuit due to their smaller diameter and subsequent lower water consumption.

Within Module 5C, the de-slimed product from Module 5B is pumped at a solids density of 20% w/w to the Cleaner WMS (CMS) units. The CMS units are triple drum Stephenson types with ceramic ferrite magnets operating at a magnetic intensity of 1000 G. For the 20 Mtpa concentrate production flowsheet, the CMS units reject 13% of the total mass to tails while limiting magnetic Fe (mFe) losses to 0.6%.

Depending upon the ore body being processed, the Cleaner Concentrate will be in the 64-67% Fe range. Testwork has indicated significant decrease in Fe grade in size fractions >45 μm for both the North Star and Eastern Limb deposits. Hence, the remaining portion of Module 5C is collectively known as the Concentrate Product Upgrade circuit where processing steps are employed to ensure the final concentrate product is at a $P_{98}$ of 45 μm (screen) in order to achieve the final product grade target of 67.1% Fe and 5.6% $SiO_2$.

Equipment within the upgrade circuit includes:

- Cons cyclones overflow contains approximately 60% of the inlet cleaner cons mass at a $P_{80}$ of 24 μm (laser) and is sent to the CCD cleaners;
- High Frequency Vibrating screens underflow contains approximately 60% of the inlet cons cyclone U/F is sent to the High grade concentrate thickener;
- High grade (HG) concentrate thickener further upgrades the High Frequency Vibrating screen U/S in a high rate thickener to a product grade of 68-69% Fe;
- Regrind Mills regrinds High Frequency Vibrating screen O/S at a $F_{80}$ of 69 (screen) to produce a product $P_{80}$ of 26-30 μm (laser) and consuming 12.2 kWh/t of power;
- Recleaner wet magnetic separators process regrind mill product at a solids density of 20% w/w through RCMS (Recleaner wet Magnetic Separation) units consisting of triple drum Stephenson types with ceramic ferrite magnets operating at a magnetic intensity of 1000 G.

The RCMS units reject 16% of the total mass to tails while limiting magnetic Fe (mFe) losses to 1.5%.

CCD cleaners process cons cyclone O/F and RCMS cons in a 2-stage de-slime circuit operating at high rise rates (8-10 m/h based on O/F) to allow additional removal of low density, high silica content solids (up to 8% mass at 45% $SiO_2$ concentration) while limiting mFe losses to 1.1%.

The upgrade circuit removes approximately 7% of the inlet cleaner concentrate mass to achieve the 67.2% Fe grade with an estimated 1% magnetic losses. The HG and CCD thickener products are combined in the Concentrate Storage Tanks and subsequently pumped to the Module 7 Port via an overland pipeline.

3.6 Module 6—Tailings

Figure 6:
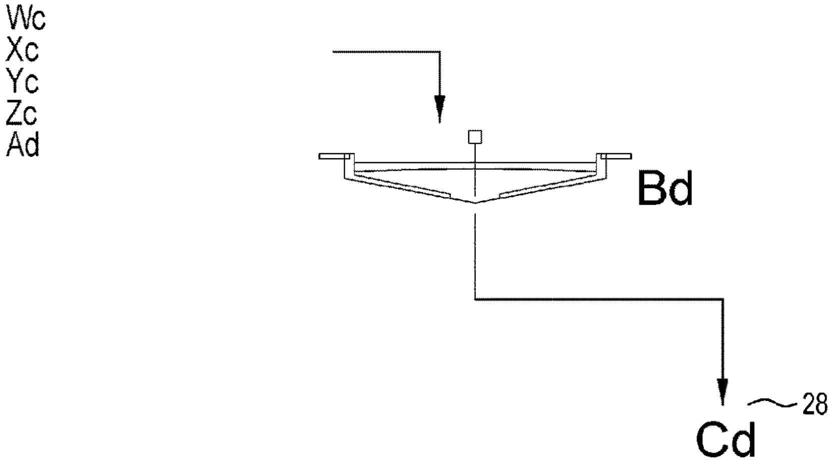
FIG. 6 shows Module 6.

Wet tailings from the RMS, CMS and RCMS are combined with overflow from the RMS Deslime and CCD Cleaner O/F streams and sent to three tailings high rate thickeners prior to pumping to a tailings storage facility (TSF). The tailings thickeners are designed to achieve an underflow density of 62% w/w solids while operating at a specific settling rate of 0.3 t/m$^2$h and rise rate of 5 m/h. Flocculant addition has been designed to 40 g/t based on testwork and coagulant addition is being considered as a mitigating strategy for reducing the amount of residual flocculant in the process water that provides make-up water to the deslime circuits. Refer to FIG. 6.

For the 20 dMtpa concentrate production flowsheet, 32 Mtpa solids with an estimated composition of 18% Fe and 52% $SiO_2$ containing 19.4 Gl/a water are transported via a 7 km slurry pipeline to the TSF.

See FIG. 6: Module 6.

3.7 Module 7—Dewatering (Port)

2,700 dt/h slurry at a density of 62% w/w solids is pumped approximately 135 km to the port. Based on testwork (Paterson & Cooke), yield stress of 1.8 Pa and plastic viscosity of 40 mPa·s was used for pumping calculations. The slurry is pumped at a solids density in the range of 55% to 68% w/w, at a velocity of 1.7 to 1.8 m/s.

Figure 7:
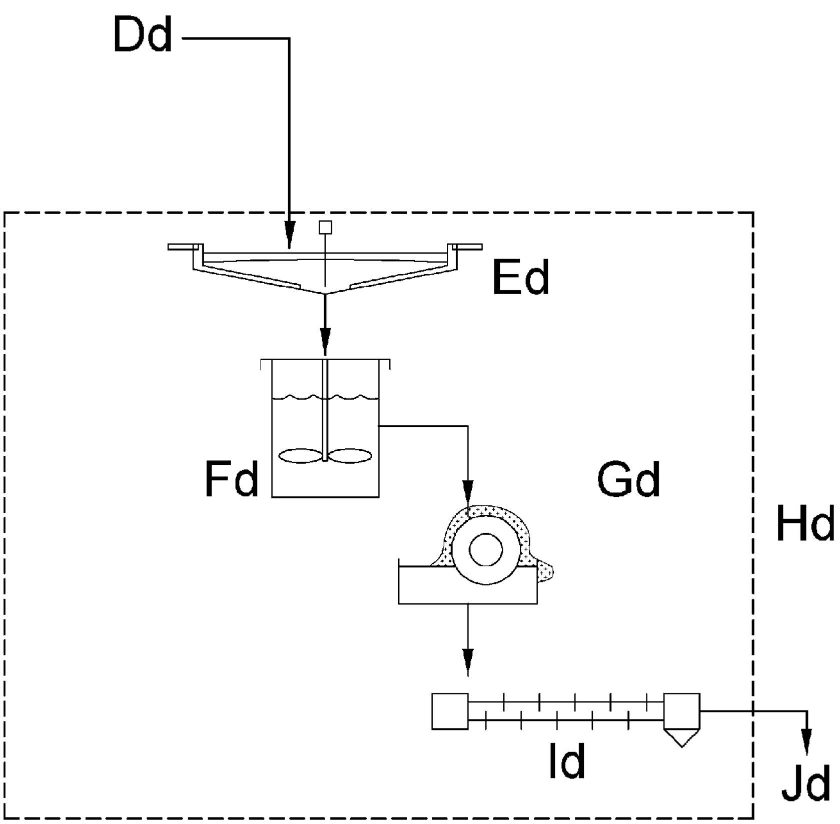
FIG. 7 shows Module 7.

The port filtration facility is based on magnetic drums and belt filters, and includes a thickener, filter feed tanks, filters and ancillary equipment, as shown in FIG. 7. Sixteen drums and 8 belt filters operate at a filtration rate to achieve a target moisture content of ≤10% w/w.

See FIG. 7: Module 7.

Notes: Process Flow

Significant novel and inventive areas to consider are combined Module 3/4, combined Module 5A/5B and Module 5C.

Module 3 Tertiary Crushing and Module 4 Grinding: The Novel Flowsheet Allows for:

- Optimisation to promote the HPGR to work more to maximise the HPGR to promote micro-fissuring of the material at lower power consumption where:
  - Inlet feed size to Module 3 can be run at top size of 80 mm preferably (and potentially to 100 mm) to reduce load on upstream secondary crushing
  - Exit feed size from Module 4 at a $P_{80}$ of 80 μm (and potentially down to 60 μm) to improve magnetic liberation and power reduction to the downstream magnetic separators and tower mills, respectively.
- Dry magnetic Separation occurring outside the two circuits allows for optimum size being sent to the DMS (top size of 6-8 mm) to effectively discard silica and non-magnetic materials at low magnetic losses (17% mass loss at 1.5% magnetic loss). Also, with the DMS being external to the circuits, this mitigates the effects of inlet feed ROM mass recovery fluctuations to the two independent circuits.

Refer FIG. 8.

Module 5a & 5b Fine Grinding: The Novel Flowsheet Allows for:

- Optimisation of mill power by using the Upstream Cyclones as a "Power" splitter by diverting approximately 25% of the material in the cyclone overflow to the downstream de-slime thickeners.
- Desliming of mill and cyclone overflow Magnetite Products at high rise rates (10 m/h) to effectively discard silica and non-magnetic materials at low magnetic losses (22% mass loss at 1.5% magnetic loss (MFe)) to ensure better operating performance exiting the downstream CMS units.

Refer FIG. 9.

Figure 9A:
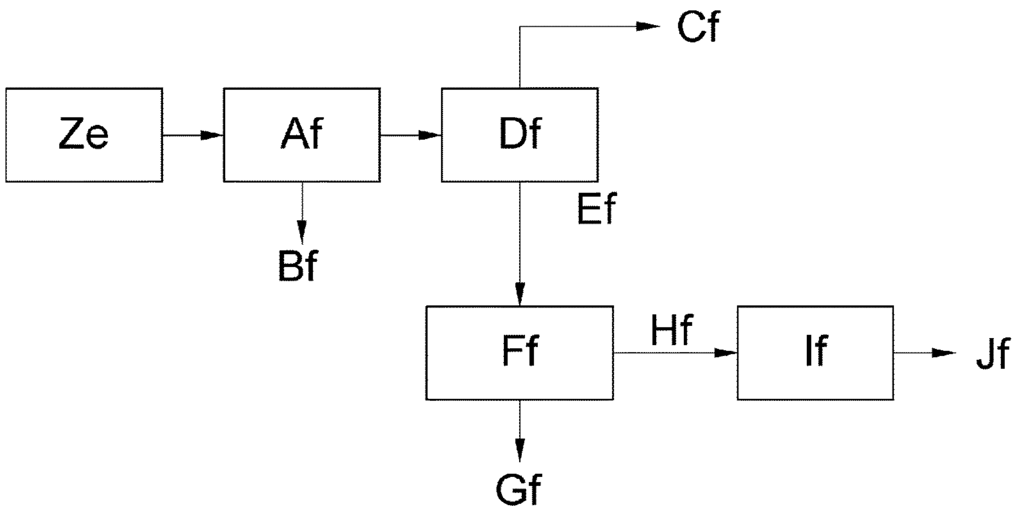

With reference to FIG. 9*a*, there is shown an alternate flowsheet which further expands claims 1-14 as depicted in FIG. 9 to demonstrate the second circuit to grind the more difficult material that has passed through the first mill circuit (Item 24). The mill product from Item 24 is further processed to remove non-magnetic materials (via the deslime thickeners and cleaner magnetic separators) where the magnetic concentrate stream is further sized via cyclones (to remove fines) and high frequency low amplitude vibrating screens where the high frequency low amplitude vibrating screen oversize stream serves as feed to the second stage open circuit mill system. Although this second stage open circuit mill system is operated at a higher energy grind mode than the first stage circuit, the feed to the second stage circuit is only 12-18% of the feed stream to the first stage mill circuit, thus minimising overall mill power consumption by only grinding the larger, lower flow rate, more difficult material.

Module 5c Product Upgrade Circuit: The Novel Flowsheet Allows for:

- Guaranteeing Fe grade at 67+% for all ore bodies considered for the project. Typical upgrade of 64+% Fe to 67+% Fe with <10% mass loss of the feed to Module 5c (or 2-3% of original ROM feed).
- Upgrade circuit minimises additional grinding by only processing 15-20% of the CMS cons material and ensures final concentrate product is at a $P_{98}$ of 45 μm (screen) to achieve target grade of 67+% Fe and <6% $SiO_2$.
- Potential to provide a High Grade magnetite product i.e. 25% of total product at a Fe grade >68%.

Refer FIG. 10.

As will be understood from the foregoing, an example of the invention provides an apparatus for processing magnetite iron ore, including a first high pressure grinding roller (HPGR) for crushing the magnetite iron ore into particles, and a second high pressure grinding roller (HPGR) for grinding the particles. Advantageously, the applicant has determined that energy savings are achieved by having a first HPGR which does a crushing operation and a second HPGR which does a grinding operation. It would not previously have been conceived that an HPGR could be used to reduce a feed particle size distribution of 8 mm, 100% passing ($F_{100}$8 mm) to produce a product $P_{80}$ of 80 μm owing to vibrations, the product being too fine, the absence of voids and chatter from the machinery. The applicant has identified viscosity in the material, an ability of the HPGR to shear iron ore material from the silica, and has applied inventiveness to arrive at an arrangement which enables significant energy and cost savings. The present invention involves an unexpected result that has been achieved by virtue of the inventors' knowledge, expertise, ingenuity and time investment.

In one form, the first high pressure grinding roller may crush the magnetite iron ore from a feed particle size distribution of at least 80 mm, 100% passing (F10080 mm), to a feed particle size distribution of 8 mm, 100% passing (F10080 mm). The second high pressure grinding roller crushes the particles from a feed particle size distribution of 6-8 mm, 100% passing, to a feed particle size distribution of 60-100 μm, 80% passing.

Advantageously, there is provided a method of processing a low moisture magnetite ore body via a two-stage HPGR circuit which allows for the optimisation of the HPGR to work from top size of 80 mm to produce a product $P_{80}$ of 80 μm to reduce power consumption. A first HPGR circuit may be in closed circuit with a screen, and a second HPGR circuit may be closed with an Air Classifier/Baghouse system. The two circuits may be separated by Dry Magnetic Separation, to remove non-magnetic waste material prior to the second circuit, thus reducing the throughput and additional grinding to the second HPGR circuit.

Advantageously, examples of the present invention ensure that 67% Fe grade is achievable from 64-65 wt % total Fe magnetite feed streams with minimal mass loss by (a) removing slimes (cons cyclone) prior to further hydroseparation processing; and (b) limiting +45 micron material to <2 wt % in the final product stream via derrick screens followed by regrind mills and magnetic separators to limit oversize mass loss.

Advantageously, the present invention provides a method of dewatering fine magnetite concentrate ($P_{80}L \leq 45$ μm or more specifically $P_{80}L$ of 25 μm-35 μm) to ≤10% w/w moisture content, with an apparatus for dewatering magnetite, where the dewatered magnetite is discharged from the drum and further dewatered using a conveyor belt filter arranged such that the magnetite conveyed along the upper surface of the belt filter will compress itself downwardly under magnetic attraction within the magnetite such that water is further expelled from the magnetite and drains through the conveyor belt filter.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

EXPLANATION OF REFERENCE LETTERS IN THE DRAWINGS

FIG. 1
A Primary crushing (×2)
B Secondary crushing (×6)
C Coarse ore stockpile
D High pressure grinding rolls (4)
E Fines
F Air classifiers (×10)
G Bag houses (×6) 4 full size/2 half size
H Mags
I Oversize
J Undersize
K Dry screens (×10)
L Coarse
M High pressure grinding rolls (×8)
N Dry magnetic separation (×20)
Coarse rejects stockpile
P Water addition
Q Coarse transfer tanks (×2)
R Cyclone overflow
S RMS mags
T Rougher wet magnetic separation (×58)
U RMS non-mags
RMS deslime thickener overflow
W Cyclone underflow
X Fine grinding mills (×7)
Y Tailings thickeners (×3)
Z To tailings storage facility
Aa Overflow
Ba RMS Deslime LFCUs (4×1)
Ca RMS Deslime underflow
Da Cleaner wet magnetic separation (×44)
Ea CMS mags
Fa Cyclone overflow
Ga Cyclone underflow
Ha Derrick screens (×80)
Ia Oversize
Ja Undersize
Ka Regrind mill (×2)
La Re-cleaner wet magnetic separation (×6)
Ma CMS non-mags
Na RCMS non-mags
Oa High grade concentrate thickener
Pa RCMS mags
Qa Overflow
Ra CCD cleaner LFCUs (2×1)
Sa Water addition
Ta Concentrate storage tanks (×4)
Ua Concretrate pipeline to port
Va Concentrate filter feed tank (×4)
Wa Concentrate thickener
Xa Port concentrate handling facility
Ya Dewatering drums (×16)
Za Concentrate filters (×8)
Ab PW Return to OPF
Bb Concentrate product to storage FIG. 2
Cb Module 1
Db Primary Crushing
Eb Module 2
Fb Secondary crushing (×3)
Gb Coarse ore stockpile FIG. 3
Hb Fresh feed from COS
Ib High pressure grinding rolls Jb Dry screen
Kb Oversize
Lb Undersize
Mb Mags
Nb To Module 4
Ob Dry magnetic separation
Pb Non mags
Qb DMS rejects

FIG. 4

Rb From Module 3
Sb Air classifier (static/dynamic)
Tb Fines
Ub Mags
Vb Coarse
Wb Bag House
Xb Transfer Hoppers
Yb High pressure grinding rolls
Zb Water addition
Ac RMS feed tank
Bc To Module 5A

FIG. 5

Cc From Module 4
Dc Module 5A
Ec Cyclone overflow
Fc RMS mags
Gc Rougher wet magnetic separation (×58)
Hc Water addition
Ic RMS feed tank
Jc RMS deslime thickener overflow
Kc Cyclone underflow
Lc RMS non-mags
Mc Fine grinding mills (×7)
Nc RMS Deslime LFCUs (4×1)
Oc To Module 6
Pc CMS mags
Qc Cleaner wet magnetic separation (×44)
Rc RMS deslime underflow
Sc CMS non-mags
Tc Module 5B
Uc Regrind mill
Vc CCD cleaner LFCUs (2×1)

FIG. 6

We Module 5A RMS non-mags
Xc Module 5B RMS Deslime O/F
Yc Module 5C CMS Non-mags
Zc Module 5C RCMS Non-mags
Ad Module 5C—CCD cleaner O/F
Bd Tailings thickeners (×3)
Cd To tailings storage facility

FIG. 7

Dd Concentrate pipeline to port
Ed Concentrate thickener
Fd Concentrate filter feed tank (×4)
Gd Dewatering drums (×16)
Hd Concentrate handling facility
Id Concentrate filters (×8)
Jd Concentrate product to storage

FIG. 8

Kd Fresh feed
Ld Module 3
Md High pressure grinding rolls
Nd Module 4
Od Oversize
Pd Undersize
Qd Dry screen
Rd Mags
Sd Air classifier (Static/dynamic)

Td Fines
Ud Coarse
Vd Dry magnetic separation
Wd Non mags
Xd DMS rejects
Yd High pressure grinding rolls
Zd Bag House
Ae Transfer hoppers
Be Water addition
Ce RMS feed tank
De To module 5A

FIG. 9

Ee Air classifier fines
Fe Module 5a
Ge Cyclone overflow
He Module 5b
Ie RMS cons
Je RMS tails
Ke Magnetic separator
Le Upstream cyclone
Me To Module 6
Ne Cyclone underflow
Oe To mill feed tank
Pe HIGmill
Qe Mill product tank
Re Overflow
Se To tailings
Te Water addition
Ue Underflow
Ve CCD1
We CCD2
Xe Deslime thickeners
Ye To CMS FIG. 9*a*

Ze FIG. 9
Af Cleaner magnetic separation
Bf CMS tails
Cf Cons cyclone o/flow fines
Df Cons cyclone
Ef Cons cyclone u/flow
Ff High frequency low amplitude vibr. screen
Gf Screen u/size
Hf O/size
If $2^{nd}$ stage mill circuit
Jf Mill product

FIG. 10

Kf From Module 5C Part A
Lf CMS Cons
Mf Cyclone overflow
Nf Cyclone underflow
Of Oversize
Pf Derrick Screen
Qf Undersize
Rf HG TH Overflow
Sf High grade concentrate thickener
Tf Regrind Mill
Uf Re-cleaner wet magnetic separation
Vf RCMS Tails
Wf RCMS cons
Xf To tailings Module 6
Yf Overflow
Zf Underflow
Ag CCD1
Bg CCD2
Cg CCD3
Dg Water Addition
Eg CCD deslime thickeners
Fg Filter
Gg Feed tank
Hg To Filtration Module 7

The invention claimed is:

1. A magnetite iron ore processing apparatus, comprising:

a first high pressure grinding roller ("HPGR") configured to operate in a crushing mode for crushing the magnetite into coarse particles;

a second high pressure grinding roller ("HPGR") configured to operate in a grinding mode for grinding the coarse particles into fine particles; and a dry magnetic separation ("DMS") unit for discarding non-magnetic materials from the crushed magnetite prior to grinding, wherein each of the HPGRs has a separate feedback loop associated therewith for recycling particles through the respective HPGRs, with the dry magnetic separation unit being disposed outside the two feedback loops associated with the first and second HPGRs.

2. The magnetite iron ore processing apparatus as claimed in claim 1, wherein the DMS unit comprises a composite fabrication drum.

3. The magnetite iron ore processing apparatus of claim 1, wherein the first HPGR crushes the magnetite to a feed particle distribution size of 8 mm or less.

4. The magnetite iron ore processing apparatus of claim 1, wherein the feedback loop associated with the first HPGR includes a dry screen for separating undersize particles from oversize particles which are recycled back through the first HPGR.

5. The magnetite iron ore processing apparatus of claim 1, wherein the feedback loop associated with the second HPGR includes an air classifier for separating material at or below a target size from material which is to be fed back to the second HPGR for additional grinding.

6. The apparatus of claim 1, further comprising a bag house used for production.

7. The apparatus of claim 1, wherein the first HPGR crushes the magnetite iron ore from a feed particle size distribution of at least 80 mm.

8. The apparatus of claim 1, wherein the second HPGR grinds the magnetite iron ore to a feed particle size distribution of 60-100 μm.

9. A method of processing magnetite iron ore via two, separate high pressure grinding roller ("HPGR") circuits, including: crushing the magnetite with a first of the HPGR circuits using a HPGR that is configured to operate in a crushing mode and using a dry magnetic separation (DMS) unit to remove non-magnetic waste material from the crushed magnetite prior to grinding the magnetite with a second of the HPGR circuits using a HPGR that is configured to operate in a grinding mode, wherein the DMS unit is disposed outside of the respective HPGR circuits, to allow for the optimization of each of the HPGR circuits to reduce power consumption.

10. A method as claimed in claim 9, including the step of using the first HPGR circuit to crush the magnetite into coarse particles.

11. The method of claim 10, wherein the first HPGR circuit crushes the magnetite from a feed particle size distribution of at least 80 mm to a feed particle size distribution of 8 mm.

12. The method of claim 9, including the step of using the second HPGR circuit to grind the coarse magnetite into fine particles.

13. The method of claim 12, wherein the second HPGR circuit grinds the particles to a feed particle size distribution of 60-100 μm.

14. The method of claim 9, wherein the first HPGR circuit includes a dry screen to generate a consistent product.

15. The method of claim 9, wherein the second HPGR circuit includes an Air Classifier and/or a Baghouse system.

16. The method of claim 9, wherein the two circuits are separated by the DMS unit, thus reducing the throughput of the second HPGR circuit with respect to the first HPGR circuit.

* * * * *